Figure 1:
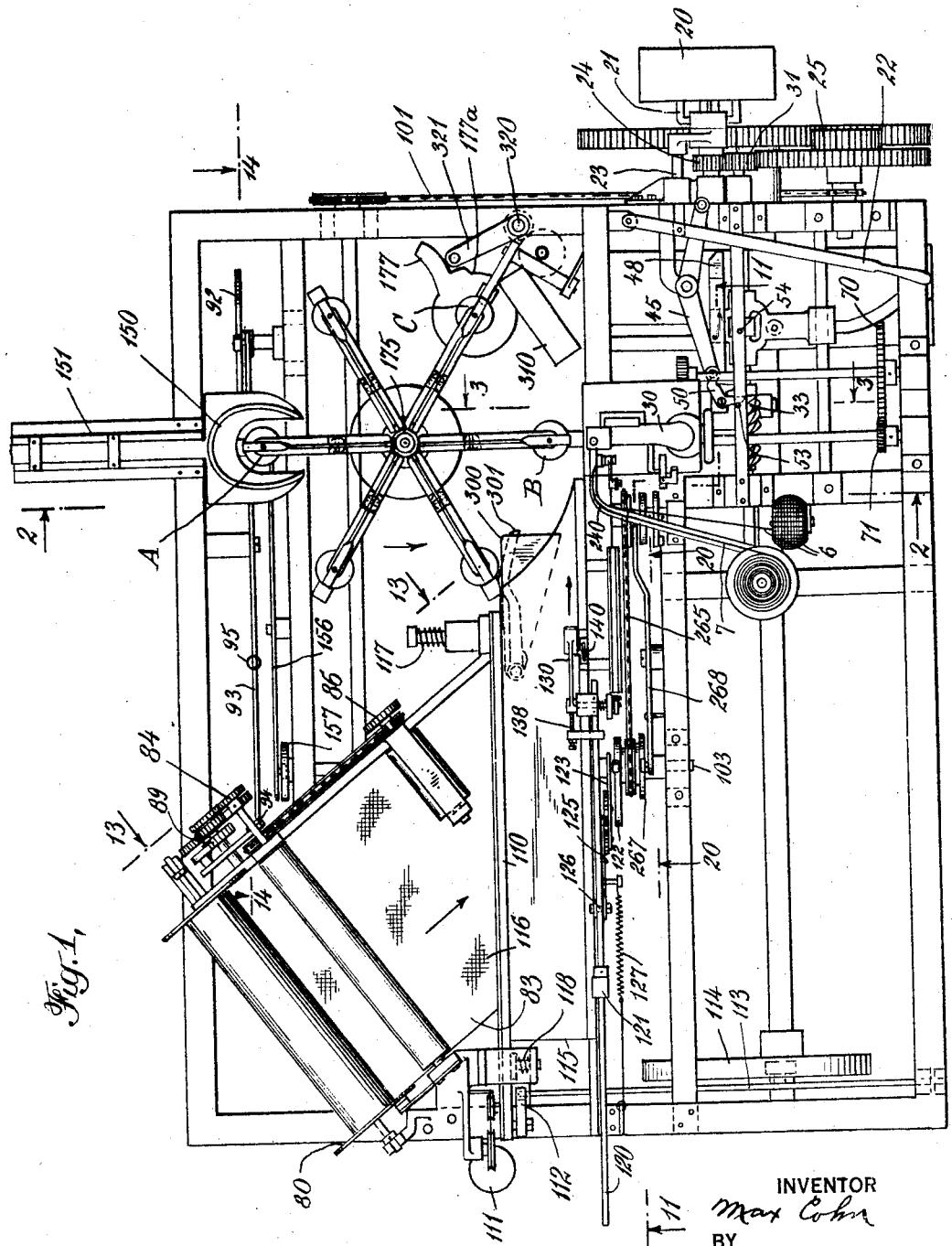

Dec. 18, 1928.　　　　　　　　　　　　　　　1,695,273
M. COHN
MACHINE FOR MAKING HAT LININGS
Filed Feb. 4, 1926　　　14 Sheets-Sheet 1

INVENTOR
Max Cohn
BY
Pennie Davis Marvin & Edmonds
ATTORNEYS

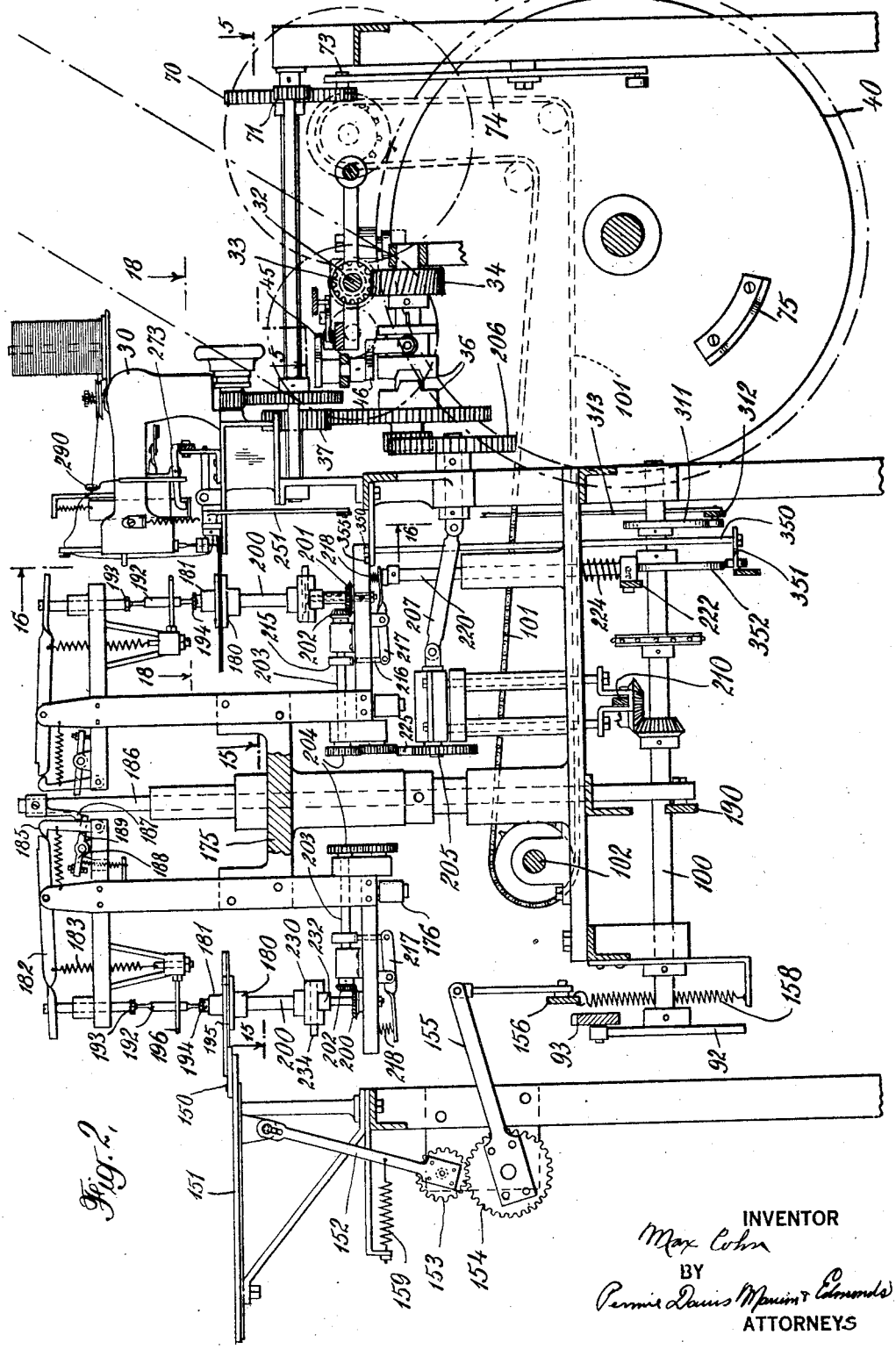

Dec. 18, 1928.　　　　　　　　　　　　　　　　　1,695,273
M. COHN
MACHINE FOR MAKING HAT LININGS
Filed Feb. 4, 1926　　　14 Sheets-Sheet 3
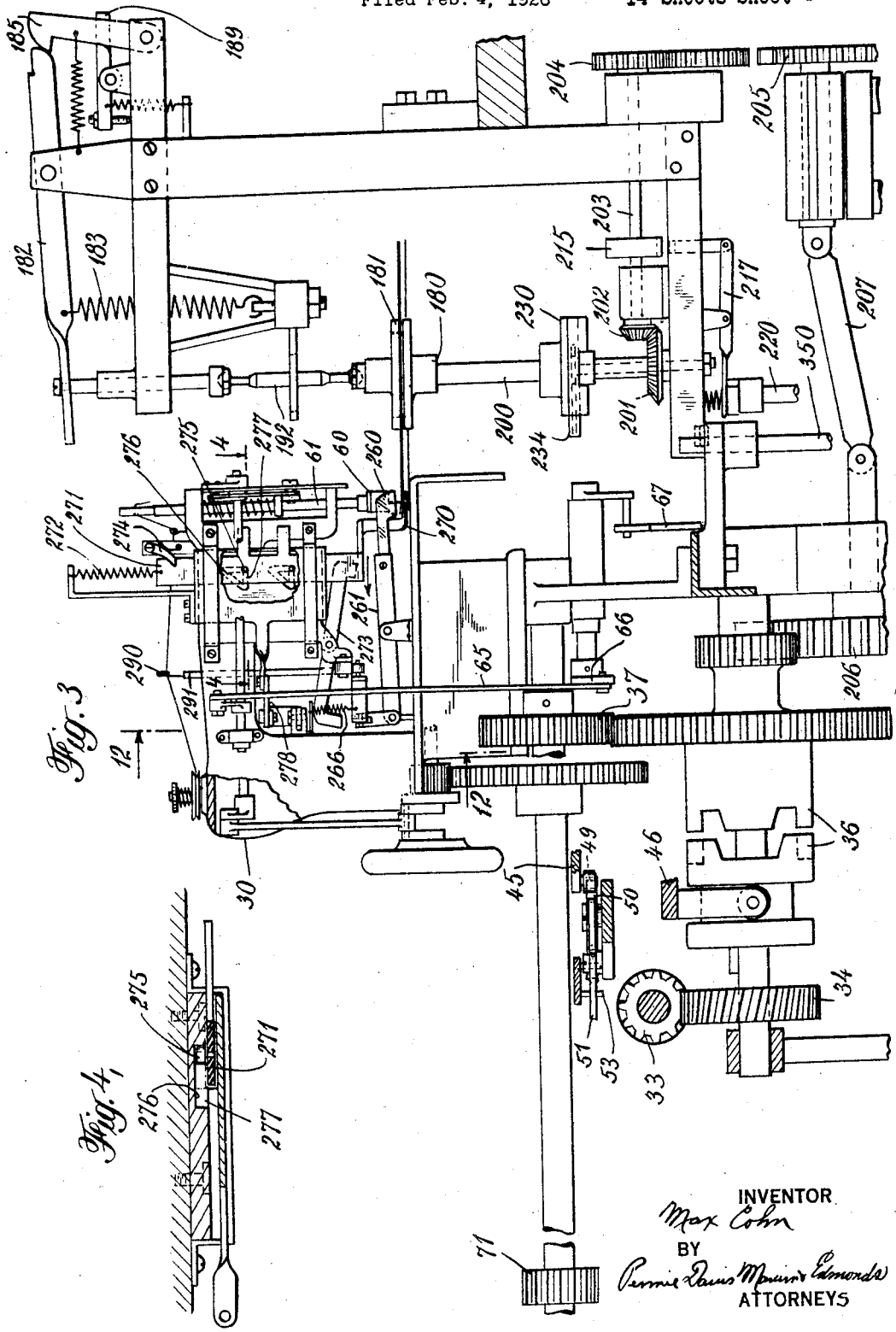
INVENTOR
Max Cohn
BY
Pennie Davis Marvin Edmonds
ATTORNEYS Dec. 18, 1928.  
M. COHN  
1,695,273  
MACHINE FOR MAKING HAT LININGS  
Filed Feb. 4, 1926   14 Sheets-Sheet 4
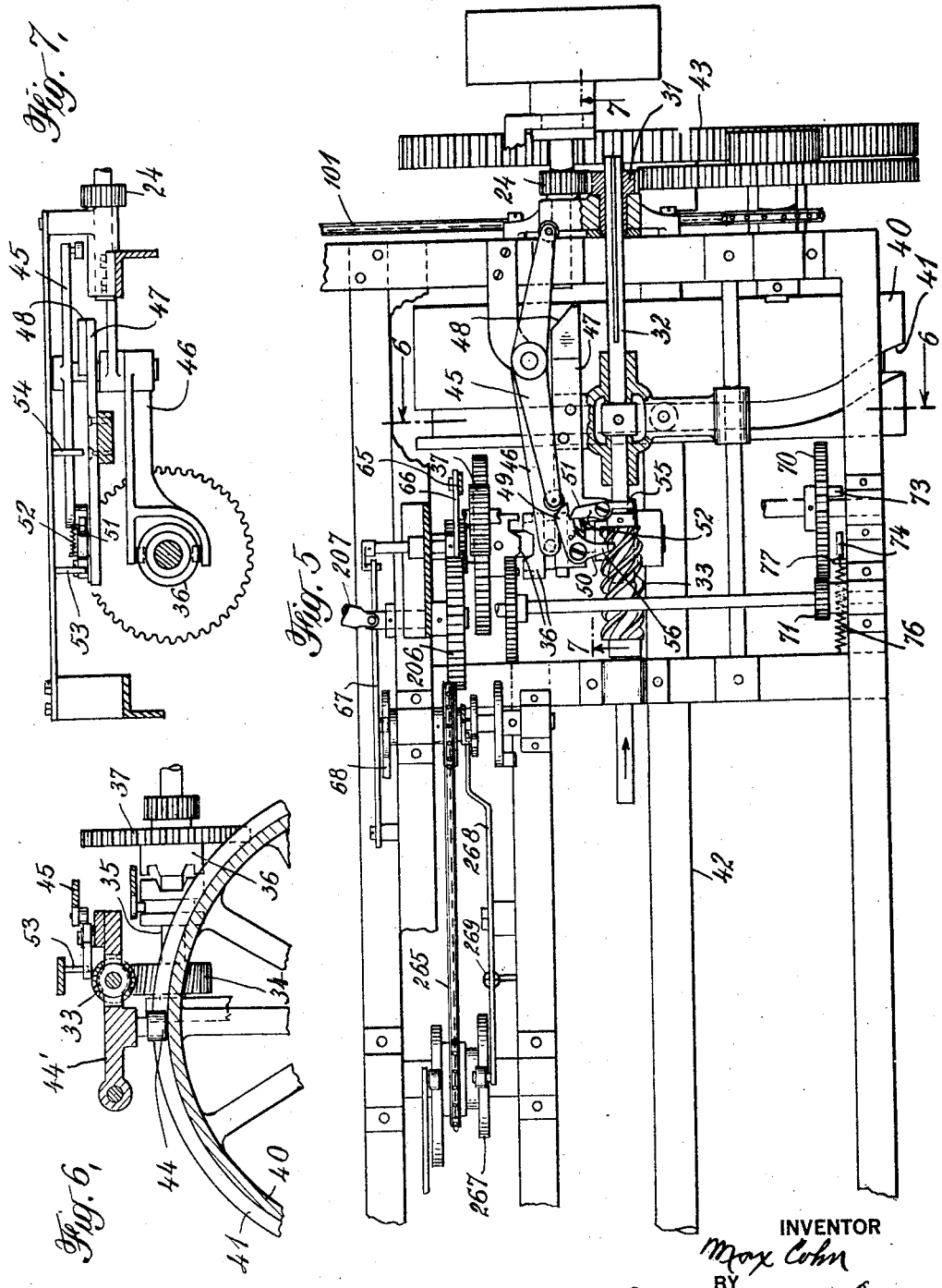
INVENTOR  
Max Cohn  
BY  
ATTORNEYS Dec. 18, 1928.  1,695,273

M. COHN

MACHINE FOR MAKING HAT LININGS

Filed Feb. 4, 1926   14 Sheets-Sheet 5

INVENTOR
Max Cohn
BY
ATTORNEYS

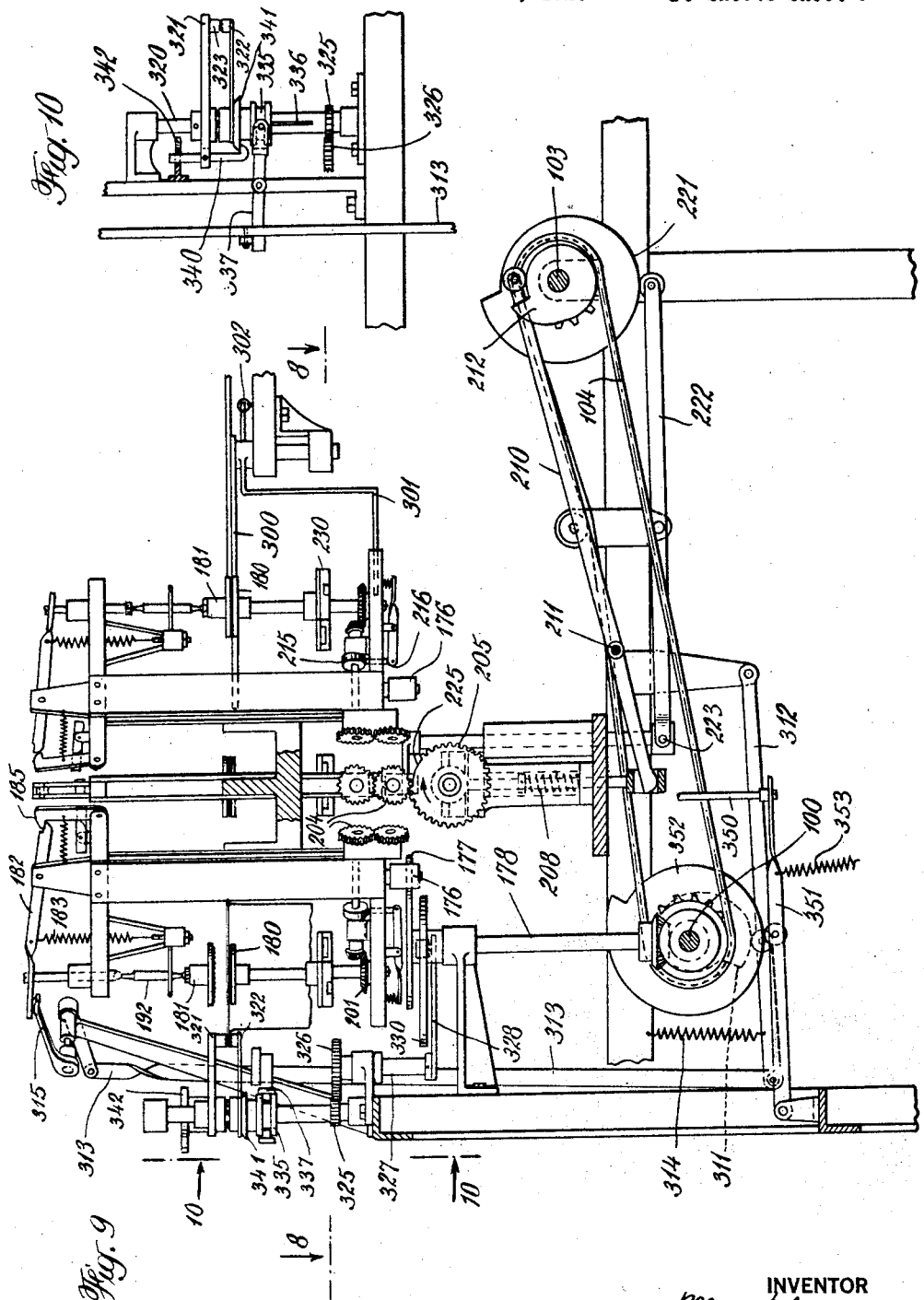

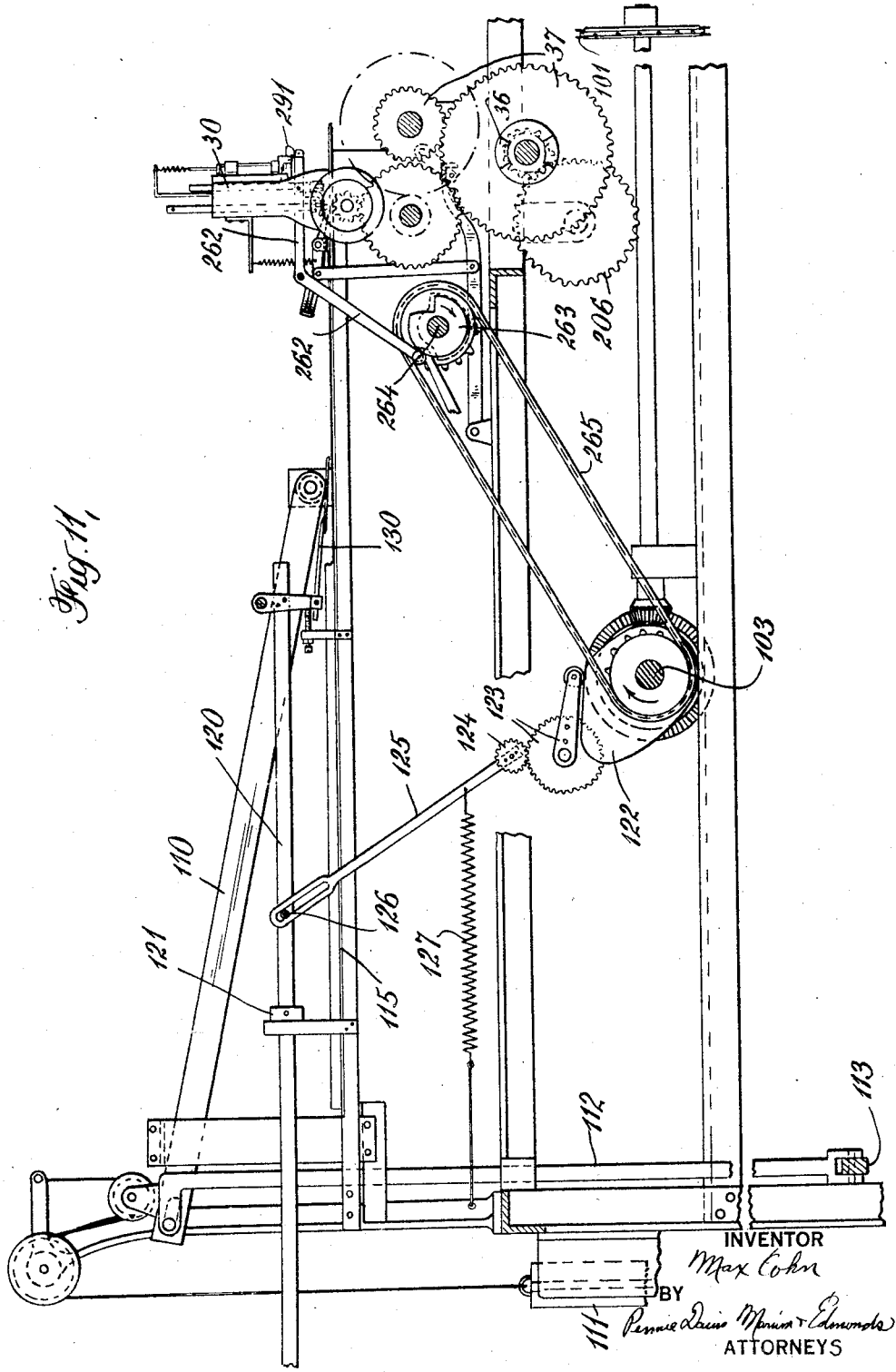

Dec. 18, 1928. 1,695,273
M. COHN
MACHINE FOR MAKING HAT LININGS
Filed Feb. 4, 1926 14 Sheets-Sheet 8
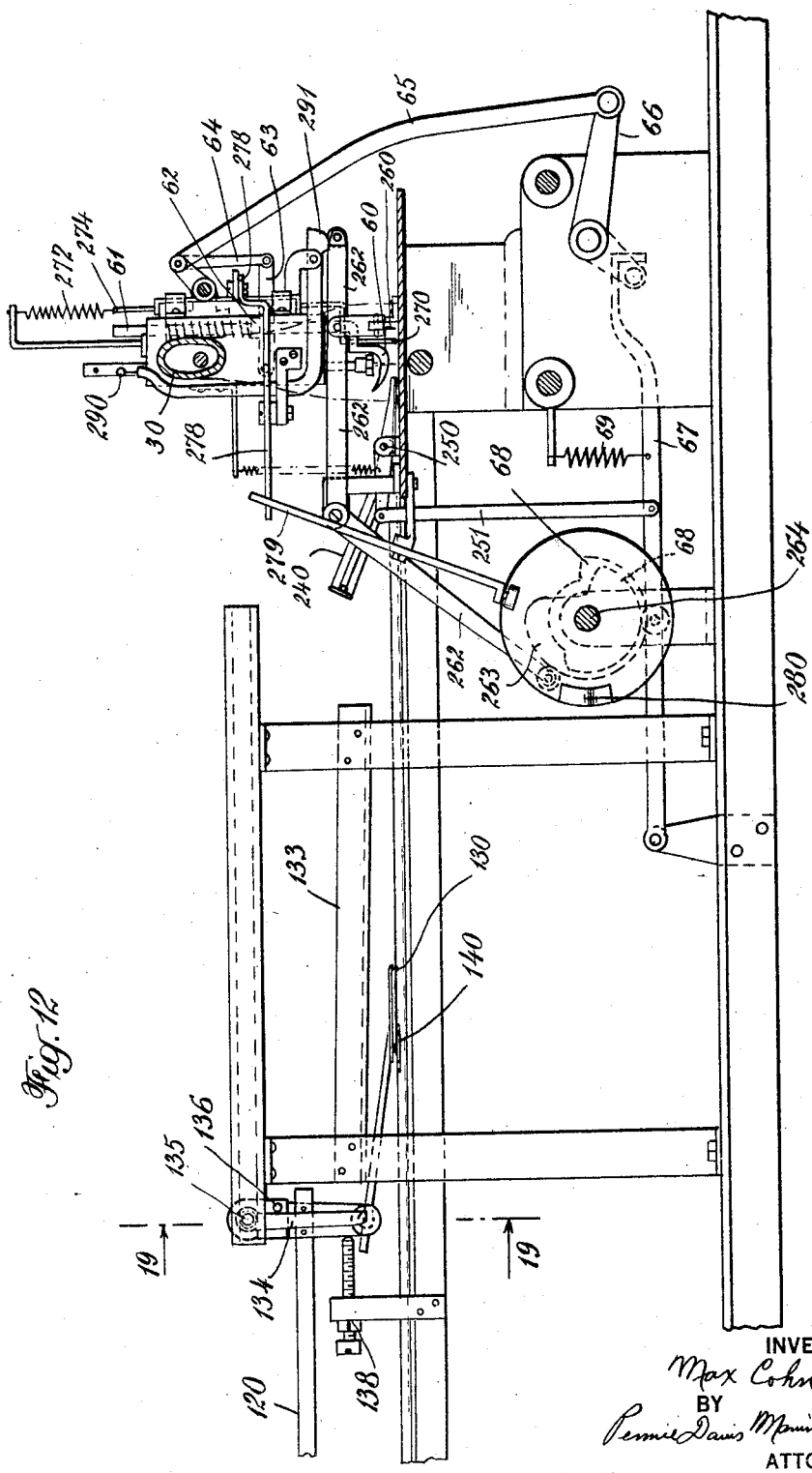
INVENTOR
Max Cohn
BY
ATTORNEYS Dec. 18, 1928.　　　　　　　　　　　　　　　　　　1,695,273
M. COHN
MACHINE FOR MAKING HAT LININGS
Filed Feb. 4, 1926　　14 Sheets-Sheet 9
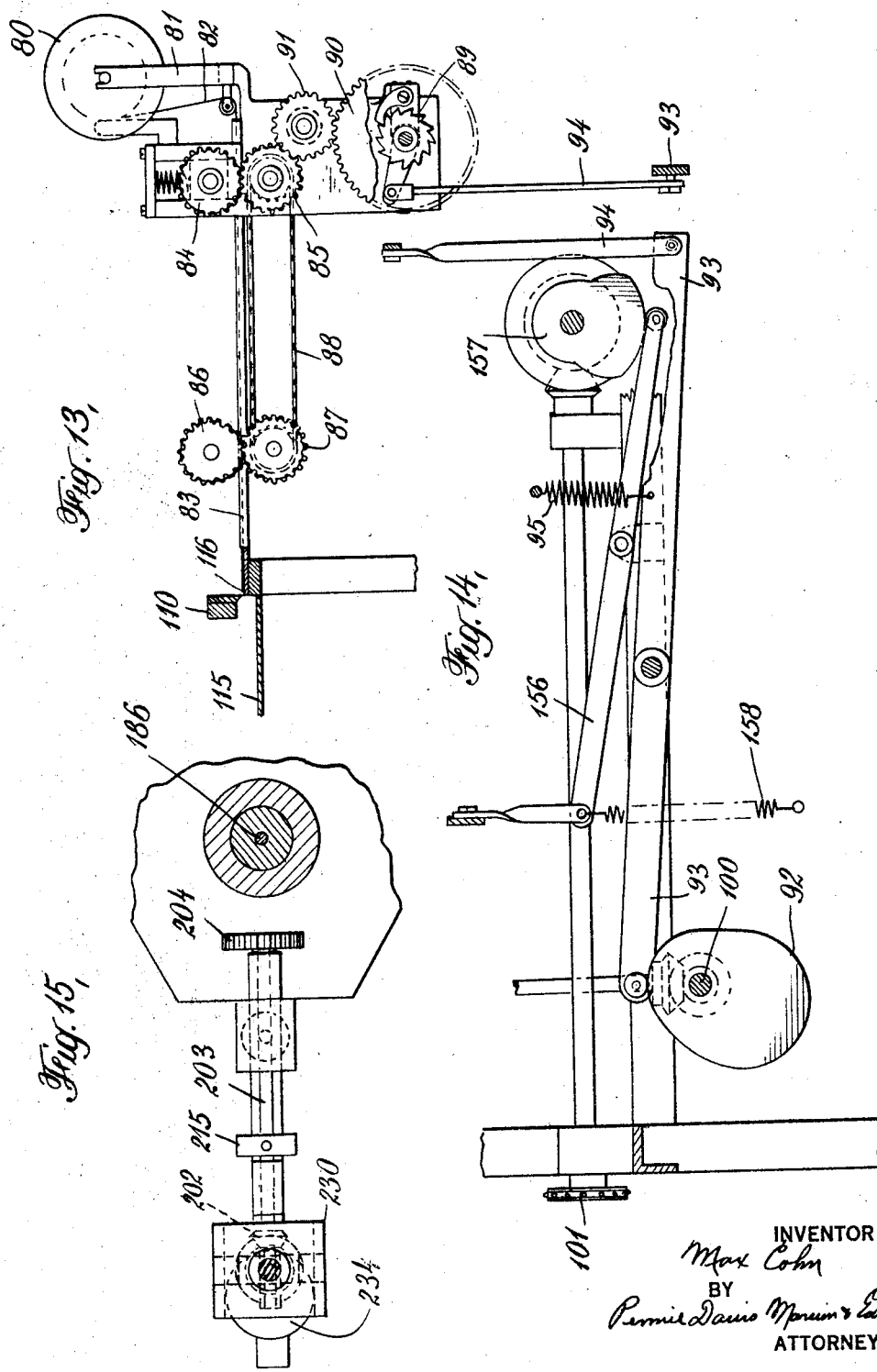

Dec. 18, 1928.                                                  1,695,273
                            M. COHN
                  MACHINE FOR MAKING HAT LININGS
                  Filed Feb. 4, 1926    14 Sheets-Sheet 10
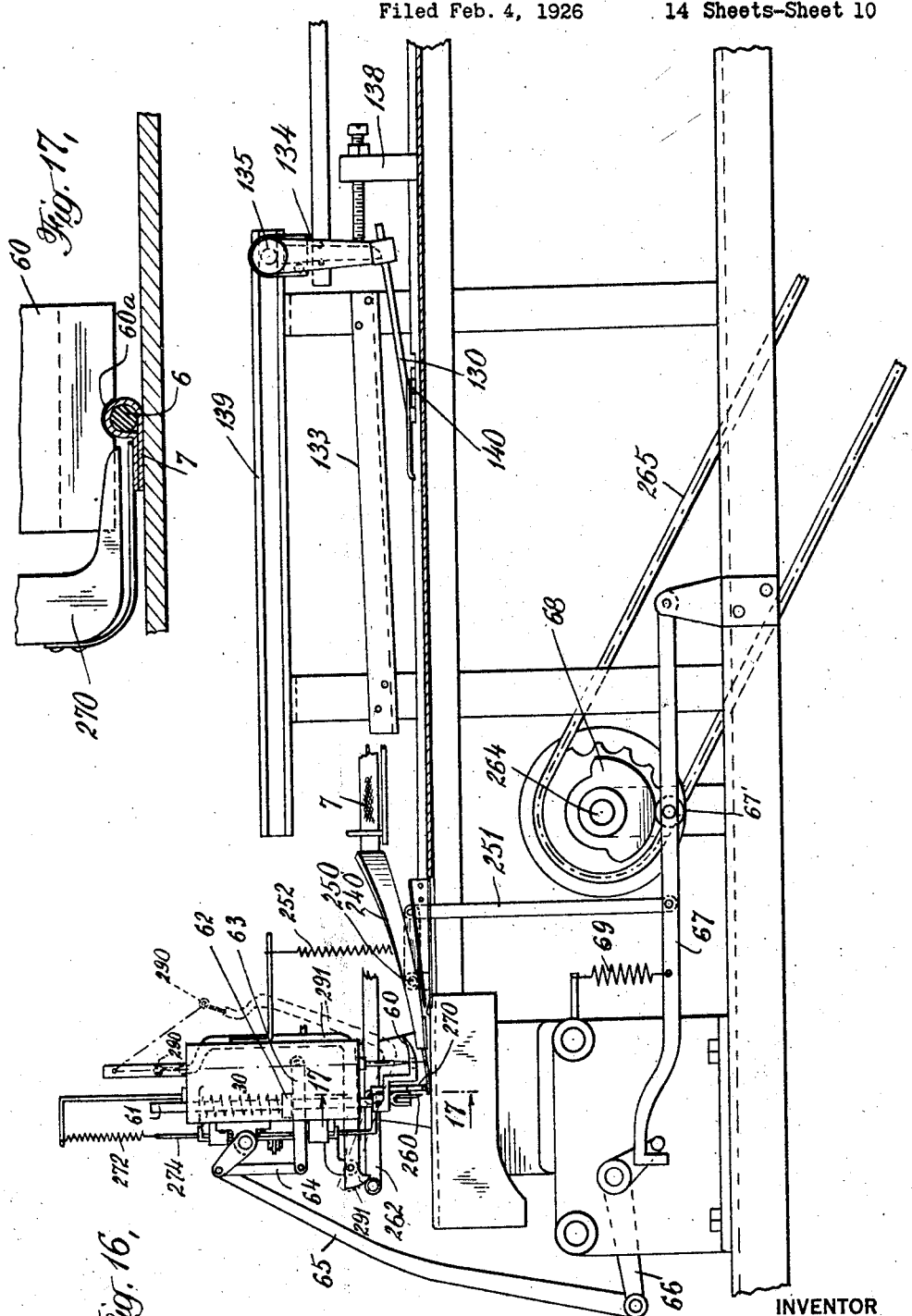
INVENTOR
Max Cohn
BY
Pennie Davis Marvin & Edmonds
ATTORNEYS Dec. 18, 1928.　　　　　　　　　　　　　　　　　　1,695,273
M. COHN
MACHINE FOR MAKING HAT LININGS
Filed Feb. 4, 1926　　14 Sheets-Sheet 11

INVENTOR
Max Cohn
BY
Pennie Davis Marvin & Edmonds
ATTORNEYS

Dec. 18, 1928.　　　　　　　　　　　　　　　　1,695,273
M. COHN
MACHINE FOR MAKING HAT LININGS
Filed Feb. 4, 1926　　　14 Sheets-Sheet 12
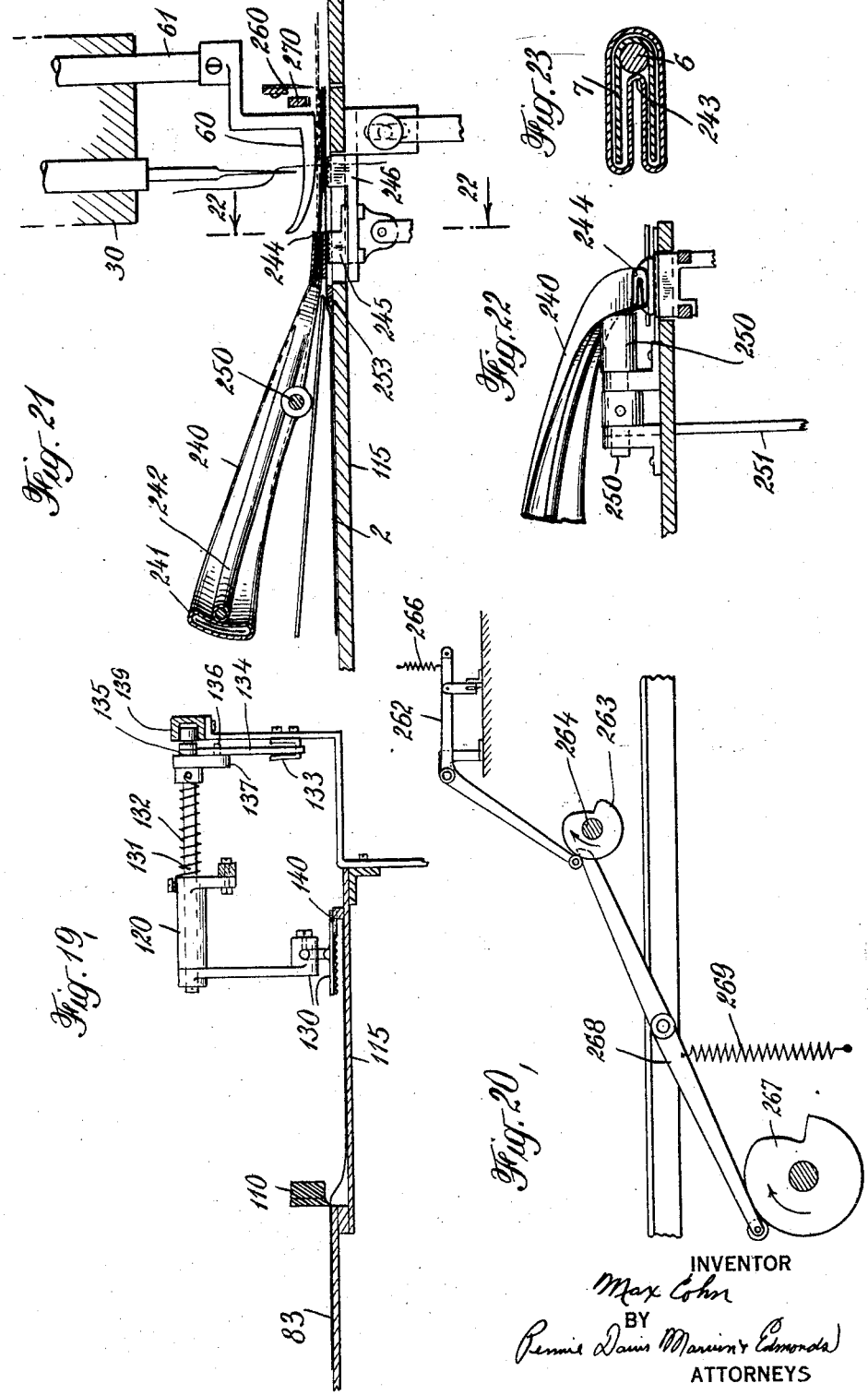
INVENTOR
Max Cohn
BY
Pennie Davis Marvin & Edmonds
ATTORNEYS

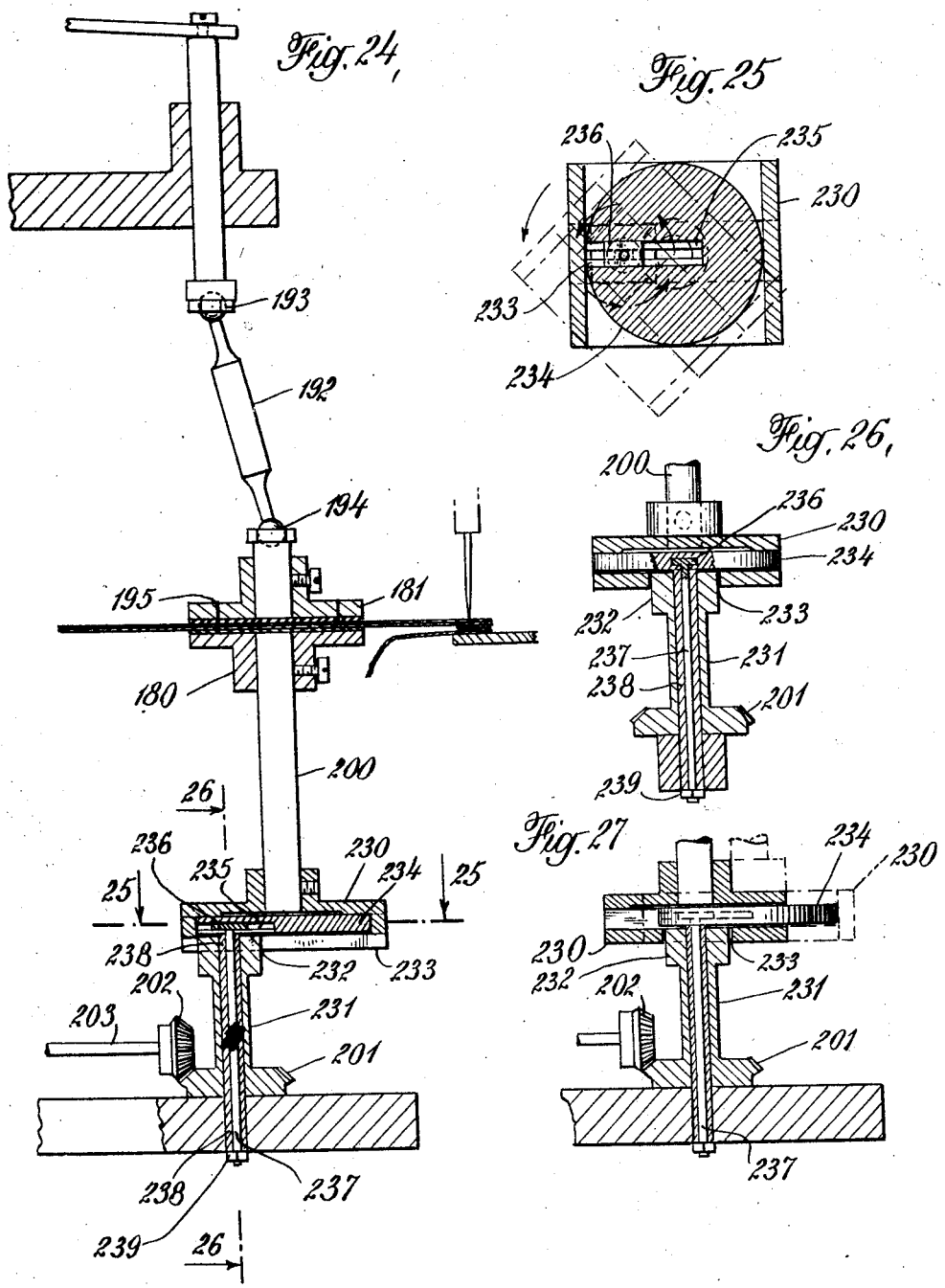

Dec. 18, 1928. 1,695,273
M. COHN
MACHINE FOR MAKING HAT LININGS
Filed Feb. 4, 1926  14 Sheets-Sheet 14

INVENTOR
Max Cohn
BY
Pennie Davis Marvin & Edmonds
ATTORNEYS

Patented Dec. 18, 1928.

1,695,273

UNITED STATES PATENT OFFICE.

MAX COHN, OF BROOKLYN, NEW YORK, ASSIGNOR TO CEE-BEE MACHINE CORPORATION, A CORPORATION OF NEW YORK.

MACHINE FOR MAKING HAT LININGS.

Application filed February 4, 1926. Serial No. 85,832.

This invention relates to the manufacture of hat linings which are generally cup-shaped, and consist of a tip, usually oval in form, and a strip of material known as a band, secured to the tip along the edge of the latter so as to depend therefrom.

Hat linings which are made of suitable fabrics, such as silk, have heretofore been made entirely by hand, different operators cutting the strips of material for the band to appropriate shape, and similarly cutting the oval tips from material, usually somewhat stiffer than that employed in the band. These parts are then stitched together on sewing machines by operators and the sewing operation must be carefully performed in order to secure a product of first quality. In some instances, a reinforcing member, consisting of a cord, enclosed within a tape, is placed in the lining around the edge of the tip, and this is ordinarily done by feeding the cord to the sewing machine in such manner that the stitching uniting the tip and band will pass through the tape. As the use of this cord necessitates that the operator control the feeding to the sewing machine of three different pieces of material, namely, the tip, the band, and the tape, the sewing operation is one which requires careful attention, and first quality products can only be made by operators of great skill.

The method of making hat linings by hand as heretofore practiced, is slow and laborious, and owing to the high degree of skill required, the charges for labor are high. Also the rate of production on a hand-controlled sewing machine is comparatively small, and many machines occupying a large amount of floor space are required in securing a large output.

The present invention is directed to the provision of a machine on which linings can be made automatically, and this machine is capable of producing linings of uniformly high quality in large quantities. The machine is entirely automatic in action, and the materials on which it operates consist of preformed tips, a bolt of cloth from which strips or bands are cut, during the operation of the machine, and a supply of cord and covering tape. The machine includes feeding mechanism by which the tips are fed with a step by step movement to a sewing machine, and other feeding devices by which cloth is drawn from the bolt, bands cut from it, and these bands fed intermittently to the sewing machine. The operation of the sewing machine is controlled by mechanism which places the machine in condition to receive a tip and band, which are fed thereto by the respective feeding devices. The tip and band are placed in the machine in proper relation to the needle by the feeding devices and, when the sewing machine is started by the control mechanism, the band and tip are united by a row of stitching extending along one edge of the band, and around the periphery of the tip. The sewing machine is also provided with suitable mechanism by which the reinforcing cord is placed in position so that a length of it may be secured between the tip and band, this cord extending around the periphery of the tip in the finished lining.

After the materials to be stitched together to form the completed lining have been placed in position in the sewing machine, the latter is started and continues in operation until the stitching is completed, whereupon the sewing machine is stopped and the completed lining withdrawn by the same mechanism by which the tip has been advanced to the machine. In such retractile movement of the feeding mechanism to withdraw the completed linings, a new tip is fed to the machine, another band supplied thereto, the cord placed in position, and the cycle of operations is repeated. At the same time, appropriate mechanism withdraws the finished lining from the tip-feeding device, and delivers it to a suitable location.

In the operation of the machine the several groups of mechanism operate in timed relation so that the formation of the band from the cloth, the advancing of this band and a tip to the sewing machine, and the withdrawal of the finished lining from the machine, take place either simultaneously or successively as required. The machine can therefore produce finished linings at a rapid rate because, as the sewing of one lining is going on, the parts for another are advancing toward the sewing machine, and the intervals during which the sewing machine is inoperative are brief. The machine requires a minimum of attention and no high degree of skill is required of the operator. The labor charges are therefore much reduced and the output is high. Also the linings produced are all duplicates with no variation in quality.

Figure 8:
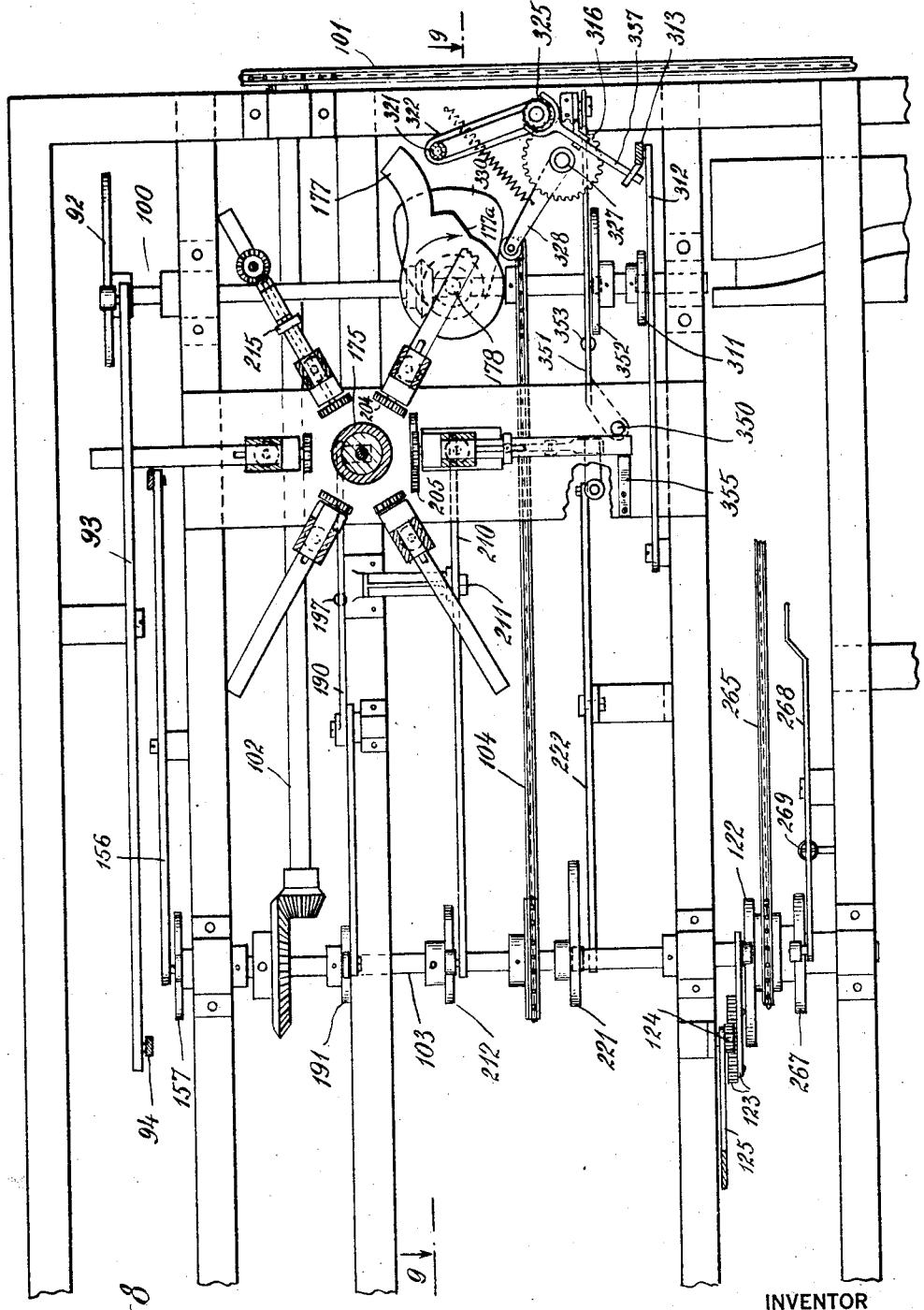
Figure 18:
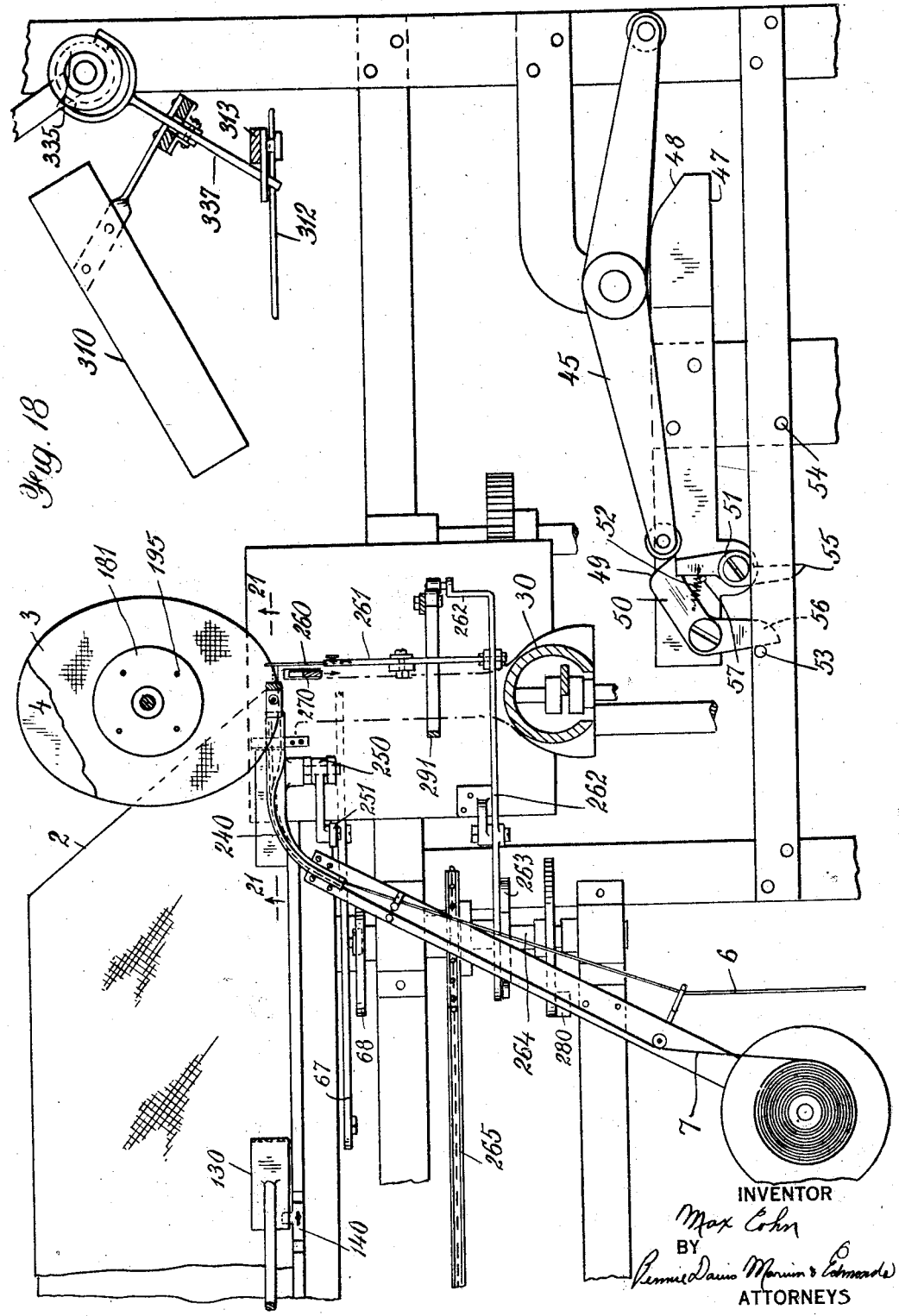
Figure 28:
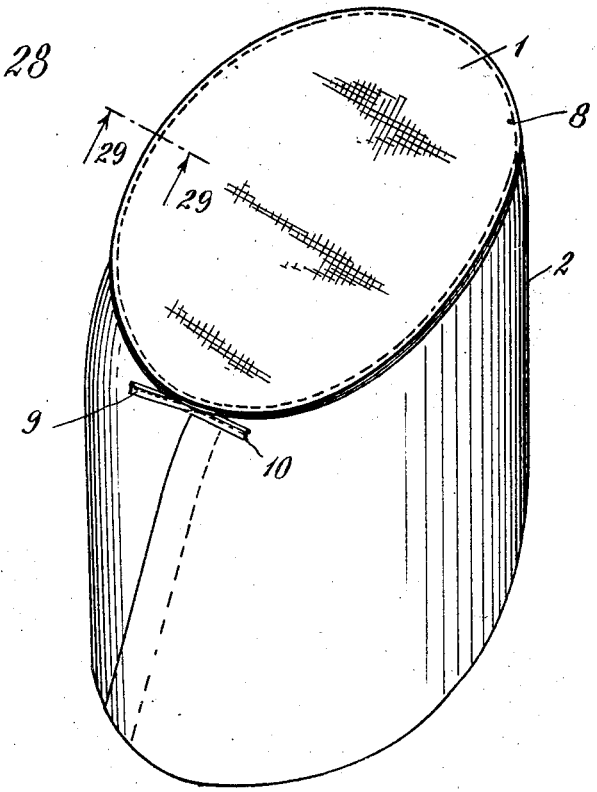
Figure 29:
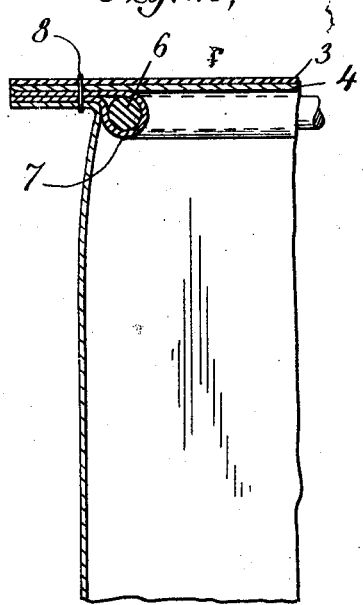
Figure 30:
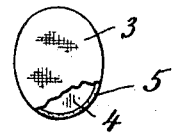
Figure 31:
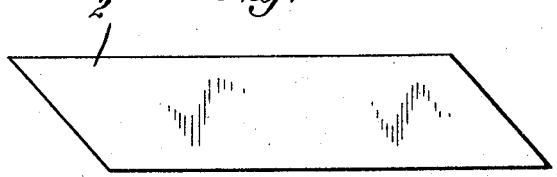

For a better understanding of the invention, reference will be made to the accompanying drawings, in which Fig. 1 is a plan view of the apparatus; Fig. 2 is a sectional view taken on line 2—2 of Fig. 1; Fig. 3 is a sectional view taken on line 3—3 of Fig. 1; Fig. 4 is an enlarged section taken on line 4—4 of Fig. 3; Fig. 5 is an enlarged detail taken on line 5—5 of Fig. 2; Fig. 6 is a sectional view taken on line 6—6 of Fig. 5 showing the clutch mechanism; Fig. 7 is taken on line 7—7 of Fig. 5 showing the clutch mechanism; Fig. 8 is a section of a part of the machine taken on the line 8—8 of Fig. 9, showing the mechanism of the turntable; Fig. 9 is a section taken on line 9—9 of Fig. 8 showing the mechanism of the turntable; Fig. 10 is a side elevation looking in the direction of the arrows 10—10 of Fig. 9 showing the lining removing device; Fig. 11 is taken on line 11—11 of Fig. 1, showing the mechanism for operating the cloth cutting knife and for operating the knife which cuts the reinforcing cord; Fig. 12 is a view taken on line 12—12 of Fig. 3; Fig. 13 is an enlarged detail of the cloth feeding mechanism looking in the direction of the arrows 13—13 of Fig. 1; Fig. 14 is taken on line 14—14 of Fig. 1 and shows the cloth feed cam and the cam which operates the tip rotating mechanism; Fig. 15 is an enlarged detail section taken on line 15—15 of Fig. 2; Fig. 16 is a section taken on line 16—16 of Fig. 2 and shows the mechanism which lifts the foot of the sewing machine at the completion of each sewing operation; Fig. 17 is an enlarged detail showing the reinforcing cord and the manner in which it is held in position; Fig. 18 is an enlarged view taken on line 18—18 of Fig. 2 and shows the cloth, the tip and the reinforcing cord and its cover in position ready to be sewed by the sewing machine; Fig. 19 is an enlarged detail of the cloth advancing mechanism taken on line 19—19 of Fig. 12; Fig. 20 is an enlarged view taken on line 20—20 of Fig. 1, showing the cams which operate the cord cutting knife; Fig. 21 is an enlarged detail taken on line 21—21 of Fig. 18; Fig. 22 is taken on line 22—22 of Fig. 21 and shows the cord and the cord covering guide; Fig. 23 is an enlarged section taken through the guide showing how the cover is placed around the cord; Fig. 24 is an enlarged detail of the tip gripping and rotating mechanism; Fig. 25 is a sectional view taken on line 25—25 of Fig. 24; Fig. 26 is taken on line 26—26 of Fig. 24; Fig. 27 is a sectional view of the eccentric mechanism which oscillates the tip in its rotary movement; Fig. 28 is a perspective view of a hat lining; Fig. 29 is a sectional view taken on line 29—29 of Fig. 28; Fig. 30 is a horizontal plan with parts cut away, showing how the tip is constructed; Fig. 31 is a plan view of the cloth which forms the side band of the hat lining.

Referring to the drawings, a hat lining is shown in Fig. 28, which consists of a tip 1, and a side band 2 sewed to the tip, around the edge of the tip. The tip of the hat lining is usually of oval shape, and is usually somewhat stiff, being made of two layers of fabric 3 and 4 secured together around their edges by an adhesive material 5. The fabric 4 is the visible part of the tip, and may be of a material such as silk, while the fabric 3 may be coarser and stiffer and is not visible when the lining is placed within a hat. The lining may be reinforced by a cord 6 which has a covering 7, the extending edges of which are sewed between the band 2 and the tip 1 by stitching 8 which unites the tip and band. The band cloth may be cut on the bias so that it has the shape as indicated in Fig. 31 prior to being sewed to the tip. In the finished lining the reinforcing cord and its cover preferably have their ends extending as shown at 9 and 10, so that the stitching 8 is extended to the ends 9 and 10, and in this manner unravelling of the stitching is in a large measure prevented.

In the making of hat linings the tips are ordinarily prepared in advance, that is, the two parts cut to oval shape secured together, and the finished tips are then ready for use. The cloth which forms the band may be fed to the machine in a continuous strip and is cut into sections conforming to the shape of the band cloth shown in Fig. 31. The cord 6 and its covering may be directed from suitable separate supplies by suitable guides, which serve to hold the cord and covering in position to be engaged by the sewing needle.

As shown in Fig. 1 the machine is provided with a pulley 20 for engagement with a belt extending to any suitable means of power, and a clutch 21 for controlling the operation of the machine, which clutch may be engaged or disengaged by means of the lever 22 and connecting link 23. The pully 20 is mounted upon a shaft which carries the gear 24 which meshes with gear 31 in the gear train 25.

The sewing machine, generally designated 30, operates intermittently during the manufacture of linings. This machine is operated from the gear 31 (Fig. 5) through the shaft 32, and pinion 33, which meshes with gear 34. This gear 34 is mounted upon a shaft 35 carrying one member of the sewing machine clutch 36, the second member of which is in connection with the train of gears 37, which transmit the power to the sewing machine.

The clutch 36 is engaged and disengaged intermittently by the mechanism best shown in Figs. 5, 6, 7 and 18. A cam wheel 40 having a peripheral cam groove 41 is mounted upon the shaft 42 which carries a gear wheel 43 forming part of the gear train 25. Entering the cam groove is a roller 44 rigidly secured to a bracket 44' secured to the shaft 32, and as the cam wheel 40 rotates, the shaft 32 is reciprocated by the action of the cam groove upon the roller. The gear 31 is splined upon the shaft 32, so that the shaft may reciprocate while the gear 31 remains in position. The reciprocation of the shaft 32 engages and disengages the sewing machine clutch 36 and the pinion 33 is of elongated formation so that the reciprocation thereof does not disengage it from the gear 34. Mounted upon the frame of the machine is a pivoted arm 45 which carries an arm 46 engaging the movable member of the clutch. The arm 45 is provided with rollers at either end and is actuated by cam surfaces on the member 47 which is carried by bracket 44'. In the reciprocation of the member 47, the cam surfaces 48 and 49 alternately engage the rollers at the ends of the arm 45 and successively engage and disengage the sewing machine clutch 36. In Fig. 5 the member 47 is shown in its extreme left position, with the clutch disengaged, and in its next movement from left to right, the cam surface 49 will cause the arm 45 to rock on its pivot. The arm 46 will then cause the clutch members to be engaged, whereupon the sewing machine is operated until the arm 45 is rocked to the opposite position by the action of cam surface 48.

The cam 49 is so formed that it is operative in one movement of the member 47 and is inoperative in the reverse movement. It comprises pivoted levers 50 and 51 drawn together by a spring 52. Between the levers is a pin 57 on the member 47, (Fig. 18) which limits the movements of the levers toward each other. This pin acts as a stop for the lever 51 when the cam is effective and as a stop for the lever 50 when the cam is ineffective. The action of the cam is controlled by means of pins 53 and 54 which are mounted upon the frame. In the extreme right end of the movement of the member 47, the depending arm 55 of the lever 51 strikes the pin 54 which causes the lever 51 to swing around its pivot until it disengages the lever 50, whereupon the spring 52 rocks the lever 50 on its pivot until it is stopped by the pin 57. In this position, the cam 49 will not engage the arm 45 in the movement of the member 47 from right to left thereby allowing the clutch 36 to remain open. At the extreme left end of the movement of the member 47, the depending portion 56 of the lever 50 engages the pin 53. This rocks the lever 50 on its pivot raising the cam surface 49, and the spring 52 draws the lever 51 underneath the lever 50. The movement of the lever 51 is stopped by engagement with the pin 57. The cam is now set up and is in position to actuate the arm 45 to engage the clutch upon movement of the member 47 from left to right. In the operation of the machine, the sewing machine clutch is engaged and disengaged by the movement of the shaft 32 and member 47 from left to right of Fig. 5, and the clutch remains disengaged during the return movement of the shaft and member 47, as the cam 49 is collapsed. At the extreme left end of the movement, the cam is again set up so as to close the clutch upon the movement of the members from left to right.

When the sewing machine comes to a stop, it is necessary that the foot of the machine, and also the sewing needle, be in raised position so that the tip and the band cloth of the lining which are fed to the sewing machine, may be placed in a position underneath the needle and the foot of the sewing machine. The mechanism which has been found satisfactory for insuring that the foot of the machine assumes a raised position at the end of each sewing operation is shown in Figs. 12 and 16. The foot 60 is mounted upon a vertically movable rod 61 having a collar 62. An arm 63 pivoted at one end on the machine, is connected at its other end by suitable links 64 and 65 to a crank 66, which is operatively engaged by a pivoted arm 67 which is actuated by a cam 68. The cam 68 is mounted upon a shaft 264 which is rotated from the train of gears 25 in timed relation to the intermittent operation of the sewing machine. A roller 67' mounted upon the arm 67, is held in engagement with the cam 68 by means of a spring 69. As the cam forces the arm 67 downwardly, the crank 66 is rocked to move the links 65 and 64 and the arm 63 upwardly, and the arm 63 engages the collar 62 to raise the foot of the machine. The cam 68 allows upward movement of the arm 67 and likewise a downward movement of the arm 63 to permit the foot 60 to move down to operative position to engage the cloth when the sewing machine is in operation.

As shown in Figs. 2 and 5, a train of gears extending from the clutch 36 operates the sewing machine. It includes the intermeshing gears 70 and 71 mounted upon their respective shafts, the gear 70 carrying a projection 73. A pivoted arm 74, mounted upon the frame, is actuated by a cam element 75 mounted upon the cam wheel 40. The arm 74, under the tension of a spring 76, is held against a rest 77 and out of the path of the projection 73 when the sewing machine is operating. In operation, the speed of the sewing machine is such that it continues to operate after the clutch 36 has been thrown out, and as a result of this over-running, the machine may stop with the needle positioned downwardly so as to interfere with the feed of the tip and band cloth of the next lining. The sewing machine is in operation during a portion of each revolution of the cam 40 and the arm 74 is rocked by cam element 75 just after the sewing machine clutch is disengaged. The arm 74 engages the projection 73 and moves the train of gears to position the mechanism so that the needle is in a raised position.

The cloth which forms the side band of the lining is wound upon a roller 80 having trunnions which are carried by the standards 81 as shown in Fig. 13. The cloth is drawn from the roll as indicated at 82 and thence along a table 83. The cloth is advanced over the table by spring pressed feeding rollers 84 and 85 and similar rollers 86 and 87. These two sets of rollers are connected by a chain 88 and both sets are operated intermittently by the ratchet 89 through the intermeshing gears 90 and 91. The ratchet 89 is operated by the cam 92 which rocks the lever 93 which is held against the cam by the spring 95. A link 94, connected to the lever, drives the ratchet mechanism. The cam 92 is mounted upon a shaft 100, (Fig. 8) which is rotated by power transmitted through the chain of gears 25, the chain 101, shaft 102, shaft 103, and the chain 104 connecting shaft 103 to the shaft 100. When the machine is in operation, the cam 92 reciprocates the arm 94 operating the ratchet device 89 and causes the spring pressed feeding rollers to feed the cloth. The feeding of the cloth is in timed relation to the intermittent operation of the sewing machine, and sufficient cloth is fed to provide a band for a lining upon each operation of the sewing machine.

As the cloth is fed by the feeding rollers, sections of the cloth are severed of the shape of the sections shown in Fig. 31. A pivoted knife 110 (Fig. 11) is normally held in raised position by the counterbalancing weight 111 and this knife is raised and lowered intermittently to sever the cloth. A link 112 is connected to the knife, and on the lower end of the link is a pivoted arm 113 which is acted upon by a cam 114 mounted upon the shaft 42 (Fig. 1). The cloth is fed from the table 83 onto the shelf 115 which, as shown in Fig. 13, is disposed at a lower level than the table 83. The table 83 is provided with a cutting edge 116 which co-operates with the knife 110. Springs 117 and 118 (Fig. 1) press the knife 110 into contact with the edge 116 to insure a clean cut of the cloth.

The knife operates intermittently, and is in timed relation to the other operating parts of the machine. When the cloth is fed from the table 83 onto the shelf 115 the knife is in raised position, and after the cloth has been fed, the knife is lowered by the action of the cam 114, and a piece of cloth is severed of the correct size and shape to make the band of a hat lining.

The severed section of cloth which lies upon the shelf 115 is in position to be advanced to the sewing needle of the sewing machine along the shelf in the direction indicated by the arrow in Fig. 1. The cloth is advanced by a member 120 which reciprocates in a guide 121. This member is reciprocated by a cam 122 mounted on the shaft 103, as shown in Fig. 11. The cam 122 operates through intermeshing gears 123 and 124, carried on studs on the frame of the machine, to oscillate the link 125 which engages a stud 126 projecting from the member 120. Oscillation of the link 125 pushes the member 120 from left to right as shown in Fig. 11, and the spring 127 acts upon the link 125 to return the member 120 to its position of rest.

The reciprocating member 120 carries a cloth gripper 130. This gripper 130 is mounted upon a rod 131 pivotally carried by the member 120, one end of which rod operates in the slideway 139, see Fig. 10. A coil spring 132 acts upon the rod 131 to move the gripper downwardly in a position to contact with the cloth so that when the member 120 moves from left to right of Fig. 11 the gripper 130 engages the cloth and moves it along the shelf 115 to the sewing machine. On the reverse movement of the member 120 the gripper 130 is raised out of contact with the cloth. This is accomplished by means of a grooved member 133 positioned on an incline to the horizontal and in this member, the depending arm 134 slides as shown in Figs. 12 and 19. The arm 134 is pivoted at 135 to the spring actuated rod 131. A pin 136 secured to an enlargement 137 upon the rod 131 is engaged by the arm 134 in one direction of movement. In the cloth advancing movement of the member 120 and gripper 130, the arm 134 is swung around the point 135 by engagement with the inclined member 133 (Fig. 12), but in such swinging movement the arm 134 has no effect upon gripper 130. On the reverse movement of the cloth advancing mechanism, the arm 134 is swung around the point 135 in the opposite direction by engagement with the inclined member 133, and the arm 134 now engages the pin 136 and causes a rotative movement of the rod 131, raising the gripper 130 so that it will not contact with the cloth. An adjustable stop 138 limits the reverse movement of the cloth advancing mechanism. This stop engages the arm of the gripper 130 and maintains the gripper 130 in raised position as the arm 134 drops out of the grooved member 133, so that the cloth for the next lining which is fed from the supply roll may move under the gripper 130.

A projection 140, mounted upon the raised edge of the shelf 115, is positioned to contact with the gripper 130 at the beginning of the cloth advancing movement. This projection 140 is adjustable lengthwise of the shelf for the purpose of regulating and determining the correct time that the gripper 131 will contact with the cloth to advance it to the machine. It will be seen that when the cloth advancing mechanism is moved forward by the action of the link 125, the cloth gripper 130 tends to drop into engagement with the cloth as it leaves the stop 138. In so doing it strikes the stop 140 which prevents the gripper from contacting with the cloth. The adjustment of the stop 140 along the shelf, determines the effective feeding stroke of the gripper.

The tips of the lining are placed in the reciprocating receiver 150 (Figs. 1 and 2) by an operator. This receiver 150 reciprocates in the guides 151, and the reciprocatory movement is imparted thereto by the link 152 operated through the intermeshing gears 153, 154 and link 155 which is connected to a pivoted arm 156 operated by a cam 157 which is mounted upon the shaft 103. Spring 158 holds the arm 156 in contact with the cam 157, (Fig. 14) and spring 159 assists in returning the tip receiver 150 to its outermost position. The tips of the lining are placed into the receiver 150 while it is in its outer position, whereupon the receiver is moved inwardly by the cam and levers just described, to the position shown in Figs. 1 and 2. The tip is then transferred to mechanism which advances the tip to the sewing machine.

The tip advancing mechanism as shown in Figs. 8 and 9, may take the form of a turntable 175. This turntable is operated step by step advancing a tip to the sewing machine in each step. The turntable shown comprises six arms for holding the tips, and the table has six movements to one complete rotation thereof although the number of arms for holding the tips may be more or less as desired. Each arm receives a tip at position A shown in Fig. 1. The turntable 175 has rollers 176 which are engaged by a member 177 mounted upon the shaft 178 which is rotated from the shaft 100 and which moves the table step by step. The turntable is stopped at the end of each step and held in position by a spring latch 355 and a reciprocating rod 350, shown in Figs. 2 and 8. To the lower end of the rod is secured a pivoted arm 351 which is actuated by a cam 352 mounted upon the rotating shaft 100. The arm 351 is held upwardly by the spring 353. When the turntable is moving the cam action allows the spring 353 to pull the arm 351 and rod 350 upwardly so that the uppermost end of the rod 350 is positioned in the path of one of the arms on the turntable. The arm of the turntable moves over the spring latch 355 and strikes the upper end of the rod 350 and comes to a stop in a position to present a tip to the sewing machine. The arm is securely positioned between the spring latch and the rod. After the lining has been sewed together the cam 352 pulls the rod 350 down to permit movement of the table, and the rod moves up again to engage the next arm on the turntable and stop the table in this movement.

Each arm of the turntable is provided with tip gripping members 180 and 181. These members 180 and 181 are opened and closed by suitable mechanism to grip the tip, advance it to the sewing machine and then to release the tip upon the completion of the lining. The gripping surfaces of the members 180 and 181 may be of rubber and the rubber may be corrugated or roughened to hold the tip from movement relative to the grippers. Also pins 195 may be provided which project into the tip as shown in Fig. 24, to insure a firm grip of the tip. As shown in Fig. 2 the upper gripping member is carried by a pivoted arm 182 acted upon by a spring 183 which moves the gripping member 181 down into contact with the member 180 to grip a tip when it is fed to position by the tip feeder 150. When the turntable 175 moves one of the tip carrying arms to position adjacent to the tip feeder 150, the grippers 180 and 181 are separated as indicated in Fig. 9 and the tip is inserted between the two members by the movement of the member 150. In this opened position of the grippers, the pivoted arm 182 is engaged by the spring actuated hook 185 which holds the gripper 181 upwardly against the action of the spring 183. When the tip is in position, the arm 185 is caused to release the pivoted arm 182 whereby the tip is gripped by the member 181. The releasing of the hook 185 is accomplished by the central shaft 186 which carries a dog 187. When the shaft 186 moves downwardly, the dog 187 engages the rocker arm 188 which has a cam surface 189 which pivots the hook 185 until such time as it releases the arm 182. Shaft 186 is held normally in raised position by the spring 197, and downward movement of the central shaft 186 is accomplished through the pivoted arm 190 which is actuated by cam 191 mounted on shaft 103 as shown in Fig. 8.

The tip thus gripped is advanced step by step until such time as it is presented to the needle of the sewing machine at position B indicated in Fig. 1. The tip is presented to the needle of the sewing machine preferably just ahead of the presentation of the cloth which is advanced along the shelf 115 to the sewing machine, and when both are in position, they are sewed together, the tip being rotated by its holders 180 and 181. The tip gripper 181 is freely suspended from arm 182 by the link 192 having ball and socket connections 193 and 194 (Fig. 24). In the operation of the machine the step by step movements of the turntable are relatively fast, and in order to prevent undue swinging of the freely suspended gripper member 181, each link 192 is directed through a ring 196. This ring is of sufficient size to allow for the oval movement of the member 192 as the tip is rotated and oscillated. Each lower gripper 180 is mounted upon a shaft 200 which is rotated by intermeshing gears 201 and 202, the gear 202 being mounted upon the shaft 203 which is driven through a gear train 204. There is one such gear train for each gripper.

As indicated in Figs. 2 and 8, each gear train 204 is driven by the gear 205. The gear 205 is rotated intermittently with the operation of the sewing machine, and, as shown in Fig. 2, is driven by the gear train 206 and link shaft 207 under the control of clutch 36. The operation of the sewing machine and the rotation of the tip from the same clutch 36 provides for the rotation of the tip under the needle of the sewing machine when the sewing machine is operating.

For the purpose of meshing the teeth of a gear in one of the trains 204 with the teeth of gear 205, the gear 205 is mounted for movement up and down which is permitted by the link shaft 207. The gear 205 is mounted upon the sliding frame normally held in uppermost position by a spring 208, the frame being actuated by an arm 210 pivoted as at 211 and moved by the cam 212 mounted upon shaft 103 (Figs. 8 and 9). The cam 212 lowers the gear 205 each time the turntable advances a step and allows the train 204 to move over the gear 205, whereupon the gear 205 is raised and the teeth thereof mesh with the teeth of a gear belonging to the next gear train 204.

A collar 215 is secured to the shaft 203, and this collar is provided with a recess into which the end of a locking pin 216 is adapted to fit. See Fig. 2. The lower end of the pin 216 is secured to a pivoted member 217 actuated by a spring 218 which causes the pin to normally assume an upward position in the recess of the collar 215 and thus lock the tip gripping means against rotation. Each tip gripping means is so locked throughout the entire movement of that means around the turntable, and is released only when it presents a tip to the sewing machine and is to be rotated. For the purpose of removing the pin 216 from the recess in the collar 215, a rod 220 is provided. This rod is normally held downward by a spring 224 and is moved upwardly by the action of the cam 221 mounted upon the shaft 103 operating through the pivoted lever 222 which is connected to the lower end of the rod at 223 as shown in Fig. 9.

The tip is usually of oval formation and it is necessary to give the tip a reciprocatory motion as well as a rotary motion when the band is being sewed to the tip so that the edge of the tip will always be under the needle. For this purpose, an eccentric element is placed in the shaft 200 as shown in Fig. 24. The bevel gear 201 drives the gripper 180 through a tubular shaft 231, the shaft 231 having a squared end 232 which fits within a slot 233 of a box 230 which is secured to the shaft 200. Fitting within the box is a disk 234 provided with an open bottom recess 235 for accommodating the head 236 of the pin 237 extending through the shaft 231. The recess 235 extends from a central portion of the disk to the outer edge thereof as indicated in Fig. 25 A tubular member 238 within hollow shaft 231 encloses the rod 237 and projects a slight distance above the upper end of the shaft. The head 236 of the rod is adjustable along the length of the recess 235 to determine the degree of the reciprocating movement to be imparted to the tip. The disk is held in assembled relation with the pin 237 by the nut 239, and in tightening the nut the walls of the recess are gripped between the head of the pin and the upper end of the tubular member 238, as shown in Fig. 26, thus preventing rotation of the disk.

The rotation of the bevel gear 201 and shaft 231 rotates the box 230 and the shaft 200 through the medium of the squared portion 232 within the slot 233. The box rotates around the disk 234 which is positioned off center whereby an eccentric action is attained. The box 230 reciprocates back and forth relative to the shaft 231 with the squared head 232 sliding in the slot 233. The ball and socket joints of the member 192 permits the eccentric movement of the member 181.

As shown in Fig. 18 the reinforcing cord 6 and its cloth covering 7 are fed to the machine through a guide 240. As indicated in Fig. 21 the guide 240 comprises a channel 241 into which the fabric covering is directed and a channel 242 into which the cord is directed. These channels merge together and the fabric 7 is folded around the cord 6 in the manner indicated in Fig. 23. The outlet end of the guide 240 is provided with an inwardly extending member 243 which guides the cord 6 into the bight portion of the folded fabric 7. The outlet end 244 of the guide 240 is positioned adjacent the foot and needle of the sewing machine, and rests upon a cloth advancing member 245 of the sewing machine. The member 245 and a similar member 246 are parts of the sewing machine proper and it is not deemed necessary to describe their operation herein. While it is customary to make hat linings with a reinforcing cord, it may be desirable at times to make hat linings without such a cord. This can be accomplished by disposing of the cord and its covering. In this case, the machine operates the same in all respects, except that the cord and covering are not directed to the sewing machine.

The guide 240 is pivoted as at 250 and is movable on the pivot by the link 251 connected to the arm 67 which is actuated by the cam 68 as shown in Fig. 16. The spring 252 holds the outlet end 244 of the guide in contact with the member 245, and the action of the cam 68 turns the guide about its pivot to raise the outlet end 244. As shown in Fig. 21 the cloth 2 advances on the shelf 115, and a member 253 raises the cloth so that the cloth will slide over the member 245 which projects above the surface of the machine. When the cloth is being pushed into place, below the sewing needle, the cam 68 operates to raise the end 244 of the guide, thus allowing the cloth to move in between this end and the member 245 of the sewing machine. The cloth is thus positioned underneath the reinforcing cord. This occurs while the sewing machine is at rest and at this time the cam 68 also operates through the lever 67, bell crank 66 and connecting links 64 and 65 to raise the foot 60 of the sewing machine, so that the cloth may be inserted under the foot. In this manner the cloth which forms the band of the lining is positioned lowermost, with the reinforcing cord and its covering next adjacent to the cloth, and the tip, which is advanced by the turntable is positioned uppermost as indicated in Fig. 29. When the sewing machine is operated to sew the parts together the cam 68 drops the guide 240 and the outlet end 244 holds the cloth in engagement with the member 245 of the sewing machine.

When the cloth, the tip, and the reinforcing cord and its cover, are in position under the needle of the sewing machine the clutch 36 is engaged, the sewing machine operated, the tip rotated and oscillated for one complete rotation and the parts are sewed together to form a hat lining. As shown in Fig. 28 the reinforcing cord has extensions 9 and 10 which aid in preventing the unravelling of the stitching. The cord and its covering are fed to the needle in a continuous strip and at the completion of each hat lining the cord is severed by means of a knife 260.

The knife 260 is positioned to the rear of the sewing needle, as shown in Fig. 21, and when the cord is cut a projecting length of cord remains under the needle. This projecting length of cord becomes the extension 10 of the next succeeding hat lining. The knife 260 is mounted upon a pivoted arm 261, as shown in Fig. 18, which is in turn secured to the bell crank 262 having one arm thereof acted upon by the cam 263, see Fig. 11. This cam is mounted upon a shaft 264 which is driven by the chain 265 from the shaft 103. The arm 261 is acted upon by the spring 266, as shown in Fig. 3, and when the arm of the bell crank 262 is lowered by the cam 263, the spring 266 causes the knife to move downwardly severing the cord and its fabric covering. Operating in conjunction with the cam 263 is an additional cam 267 and a pivoted lever 268 actuated by a spring 269, shown in Fig. 20. This double cam arrangement provides for a rapid movement of the knife. The cam 263 allows the spring 266 to move the knife to sever the cord, whereupon the cam 267 allows the arm 268 to drop under the influence of the relatively strong spring 269 to actuate the bell crank 262 and thereby raise the knife. It is desirable that the knife action be rapid and the raising of the knife by the additional cam has been found satisfactory in producing an exceptionally rapid movement of the knife 260.

In the operation of the machine the tip is given one complete rotation and the band cloth and the tip are sewed together. After the tip stops rotating, the sewing machine continues operating for a period, and sews the covering around an additional length of the reinforcing cord. During this period the turntable is moved slightly to advance the lining relative to the sewing needle, and at the end of this period when the sewing machine comes to rest the knife 260 severs this additional length of cord, approximately centrally. One part of this additional length of cord forms the extension 9 of the lining just completed and the other part remains in the machine and becomes the extension 10 of the next succeeding lining. This slight movement of the turntable is accomplished by the peculiar shape of the cam member 177. This member has a cam surface 177$^a$ which engages a roller 176 on the turntable, to move the table sufficient to advance the tip during this period. At the end of this period the cord is severed and the member 177 advances the table one step. By reference to Fig. 9 it will be seen that the gear 205 has a portion indicated at 225, which portion has no gear teeth. The number of teeth on this gear are just sufficient to give the tip one complete rotation. Upon the stopping of the tip, and the continued movement of the sewing machine and the gear 205, the portion 225 slides past the teeth of a gear in the train 204 without causing movement of the tip.

Operating in conjunction with the cord cutting knife 260 is a cord holding device 270 mounted upon a sliding bar 271 normally pulled upwardly by the spring 272, see Figs. 3 and 21. This cord holding device moves down immediately following each cord severing operation and engages the projecting length of the cord to hold it in position. When the bell crank 262 moves to operate the knife 261, the bell crank engages the pivoted cross member 273, see Fig. 3, one end of which forces the sliding bar downwardly until such time as the spring pressed latch 274 engages in the recess in the bar and holds it downwardly. In this position the holding device 270 grips the projecting length of the cord and its cover, as indicated in Fig. 17, and holds it in position until the next operation of the sewing machine. The foot 60 of the sewing machine is provided with a groove 60$^a$, which accommodates the reinforcing cord, and the holding device 270 holds the cord in position so that it will always fit into the recess when the foot of the sewing machine comes down preparatory to the next sewing operation. The holding device 270 releases the cord at the beginning of the next sewing operation, and the releasing movement is such that the holding device is immediately positioned so as not to interfere with the sewing operation.

For this purpose the bar 271 has rollers 275 operating in triangularly shaped slots 276 which are provided in a stationary frame. To release the cord, the bar is moved from right to left with each roller 275 moving in the lowermost portion 277 of a slot. This movement disengages the latch 274 and when the rollers come to the end of the horizontal portion of the slot the holding device 270 moves upwardly along the inclined portion of the slot. For imparting this side movement to the bar 271, the bar is connected to a pivoted arm 278 which is engaged by the arm 279 which is actuated by a cam element 280 mounted upon a disk carried by the shaft 264, as shown in Fig. 12. In operation this holding device is first moved downwardly and held in downward position by the latch 274 retaining the cord and its covering as shown in Fig. 17. When the machine is ready to operate to sew the next lining, the cam element 280 engages the arm 279 which moves the arm 278 and causes a movement of the bar 271 sidewise to release the cord and to disengage the latch 274, whereupon the rollers 275 slide upwardly along the inclined portions of the slots 276 and bar 271 is again positioned so that upon downward movement it will hold the severed cord. Thus the cord holding member 270 is moved not only up and down, but is moved back out of the way to disengage the cord, so that it will not interfere with the sewing operation of the next ensuing hat lining.

When the machine is at rest and the foot and the needle are in upward position, the sewing thread which forms the stitches 8 extends from the needle to the cord which is held securely by the holder. For the purpose of allowing the tip and the cloth to move in underneath the needle it is necessary to loosen this thread and this is accomplished by the thread slacking device having an eye 290 through which the thread is directed as it passes from the supply to the needle, see Figs. 2 and 12. As the arm of the bell crank 262 operates to cause the knife to sever the cord, it engages the pivoted lever 291 and causes an oscillation of that member around it pivot point, and as the eye 290 is mounted upon the pivoted lever 291, movement of the eye withdraws a quantity of thread from the supply thereby loosening the thread which extends from the needle to the securely held cord to an extent sufficient to allow movement of the tip and cloth underneath the needle. The lever 291 is spring pressed and it returns immediately to its normal position.

As shown in Figs. 1 and 9 the shelf 115, along which the band cloth is advanced to the needle of the sewing machine, is provided with a pivoted extension 300. This extension supports the cloth adjacent to the sewing machine, and lies in the path of the arms of the turntable. A depending arm 301 is carried by the shelf, and this arm also projects into the path of the turntable so that it is engaged by a portion of the table as the table moves step by step. By thus engaging the arm 301 the extension 300 is moved about its pivot to allow movement of the table. The extension 300 is under the tension of a spring 302 which returns the extension to its normal position after a movement of the turntable.

After the sewing together of each hat lining, the turntable moves the completed lining from the sewing machine, position B, to position C, as shown in Fig. 1, where the hat lining is removed. A guide 310 may be provided for engaging and supporting the completed lining as it is moved by the turntable from position B to position C. In this position the tip engaging members 180 and 181 are separated as indicated in Fig. 9. This is accomplished through the cam 311 which actuates the lever 312 which is connected to the link 313 which is in turn operatively connected with the contacting member 315. The cam 311 acting through the lever and link moves the contacting member 315 upwardly causing it to engage and move the pivoted arm 182 until it is engaged by the hook member 185 which holds the gripping member 181 in raised position, against the action of the spring 183.

At this point the hat lining is removed by the removing means, shown in Fig. 10. The removing means comprises a rock shaft 320 upon which is mounted arms 321 and 322 having gripping members 323 and 324. These members may be of rubber, and may be corrugated to grip the lining. Mounted upon the shaft, as shown in Figs. 8 and 9, is a gear 325 meshing with a gear 326 which is mounted on a shaft 327, the opposite end of which shaft has an arm 328 which is held by a spring 329 so that the arm is pressed against the cam 330 turning on the shaft 178. The cam 330, in its rotation, oscillates the shaft 320 and the arms 321 and 322 which carry the gripping members for gripping the hat lining. The arms move toward the lining at position C, grip the lining, and then move away carrying the lining, and then deposit the lining at one side of the machine.

As the arms 321 and 322 move to a position to grip the lining the arm 322 is raised to bring the gripping members together to grip the hat lining. The arm 322 is mounted upon a sleeve 335 which is slidable upon the shaft 330, the shaft having a slot 336 through which a pin passes to fix the sleeve to the shaft. Engaging the sleeve 335 is a pivoted lever 337, which pivoted lever is engaged by a projection on the link 313, which is actuated through the lever 312, and the cam 311.

When the cam 311 raises the sleeve and the arm 322, the arm is held in raised position by a hook 340 which engages an enlarged portion 341 upon the sleeve 335, thus holding the gripping members together so that they will grip the lining. The shaft 320 now rotates to move the arms carrying the lining away from the machine. A bracket 342 engages the upper end of the hook 340 and this bracket is provided with a cam surface which gradually moves the hook 340 about its pivot so that the hook disengages the portion 341 to allow the gripper arm 322 to drop. This occurs after the shaft 320 has moved to position the arms away from the machine and the completed hat lining is deposited at one side of the machine.

In the operation of the machine, power is transmitted through the pulley, and the sewing machine operates intermittently with a period of rest between each operation, by the successive engagement and disengagement of the sewing machine clutch. The cloth feeding and advancing mechanism, and the turntable for advancing the tips, operate in timed relation to the intermittent operation of the sewing machine to present sections of band cloth and the tips to the sewing machine. The cloth is fed from a supply roll, a section of cloth is severed, and this section is advanced to the sewing machine. The turntable operates step by step, and in each step one arm receives a tip at position A, one arm advances a tip to the sewing machine which is position B, and one arm carries a completed lining from position B to position C, where it is removed and deposited at one side of the machine. The reinforcing cord and its covering remain underneath the sewing needle, in a position to be engaged by the mechanism of the sewing machine when the machine is operated. During the periods of rest of the sewing machine, the foot and needle are in raised position, and the reinforcing cord and its cover are held down against the surface of the table of the sewing machine. The thread which is directed through the eye of the needle extends from the needle to the cord, and in order to permit the presentation of the tip and the band cloth, the thread is loosened. The tip is preferably positioned underneath the needle before the band cloth is positioned underneath the needle, and as the tip is moved under the needle, it pushes the loosened thread out of the way.

When the tip and cloth are thus positioned, the sewing machine operates and sews the band cloth around the edge of the tip, the tip being given one complete rotation. The tip now comes to a stop and the sewing machine is allowed to continue for a short period during which period the turntable moves slightly, to advance the lining relative to the sewing needle. During this period the covering is sewed around an additional length of cord, which extends from the edge of the tip. The cord severing knife now operates to sever this additional length of cord, approximately centrally, so that one part remains on the completed lining, as an extension, and one part remains in the machine to become one of the extensions of the next succeeding lining. Immediately after the cord is severed the turntable moves one step, thereby moving the completed lining to the position C, where it is removed, and placing one of its arms in position A, to receive a tip, and placing another of its arms in position B, in which position a tip is presented to the sewing machine.

I claim:

1. A machine for making hat linings which consist of a tip and a band stitched to the edge of the tip, comprising the combination of a power driven sewing machine, means for advancing a succession of tips to the needle of the sewing machine one after another, and separate means for advancing bands to the needle and positioning a band in proper relation to each tip, whereby the edges of the tip and band may be united by the sewing machine by stitching.

2. A machine for making hat linings which consist of a tip and a band stitched to the edge of the tip, comprising the combination of a power driven sewing machine, means for advancing a succession of tips to the needle of the sewing machine one after another, separate means for advancing bands to the needle and positioning a band in proper relation to each tip, whereby the edges of the tip and band may be united by the sewing machine by stitching, a clutch for controlling the operation of the sewing machine, and automatic mechanism acting on the clutch for causing the sewing machine to be driven after the band and tip have been placed in proper relation thereto and for stopping the sewing machine when the tip and band have been completely united by stitching.

3. A machine for making hat linings which consist of a tip and a band stitched to the edge of the tip, comprising the combination of a power driven sewing machine, rotary means for advancing a succession of tips to the needle of the sewing machine one after another, and reciprocatory means for advancing bands to the needle of the sewing machine and positioning one of these bands in proper relation to each tip whereby the edges of the two may be united by the sewing machine by stitching.

4. A machine for making hat linings which consist of a tip and a band stitched to the edge of the tip, comprising the combination of a power driven sewing machine having a reciprocating needle, means for advancing a succession of tips to the needle one after another, means for feeding bands to the needle and positioning a band in proper relation to each tip whereby the edges of the band and tip may be united by stitching, means for starting and stopping the sewing machine, and means operable after each period of operation of the sewing machine to place the needle in such a position that the band and tip may be advanced into sewing position.

5. A machine for making hat linings which consist of a tip and a band stitched to the edge of the tip, comprising the combination of a power driven sewing machine, means for advancing a succession of tips to the needle of the sewing machine one after another and placing each tip in proper position to be sewn, means for drawing band material from a supply, means for severing individual bands therefrom, and means for advancing a severed band to the needle and positioning this band in proper relation to a tip, whereby the edges of the two may be united by stitching.

6. A machine for making hat linings which consist of a tip and a band stitched to the edge of the tip, comprising the combination of a power driven sewing machine, means for advancing a succession of tips to the needle of the machine one after another, means for drawing cloth from a supply, a cutting device for severing bands from the cloth, and means for advancing the bands to the needle of the sewing machine and positioning each band in proper relation to a tip whereby the edges of the two may be united by stitching.

7. A machine for making hat linings which consist of a tip and a band stitched to the edge of the tip, comprising the combination of a power driven sewing machine, means for advancing a succession of tips to the needle of the machine one after another, means for advancing bands to the machine and positioning a band in proper relation to each tip whereby the edges of the two may be united by stitching means for supplying a reinforcing cord enclosed in a cover to the needle of the sewing machine in proper position to be stitched between the band and tip by the action of the needle and control mechanism for starting the sewing machine after a tip and band have been placed in proper relation to the needle thereof and for stopping the machine when the tip and band have been united, this control mechanism permitting the sewing machine to continue operation after the band and tip have been united throughout the periphery of the tip whereby the sewing machine, in this overrunning action stitches the cover about a length of cord additional to that required to extend around the periphery of the tip.

8. An apparatus for making hat linings, comprising the combination of a sewing machine, means for operating the sewing machine intermittently, means for feeding cloth in a continuous strip in a direction at an oblique angle to the direction of stitching produced by the machine, severing means for cutting pieces from the strip, and means for advancing the severed pieces to the needle of the machine during the operation thereof in a direction parallel to the direction of stitching, the said severing means and advancing means operating in timed relation to the operation of the sewing machine.

9. An apparatus for making hat linings, comprising the combination of a sewing machine, means for operating the sewing machines, means for advancing to the sewing machine a section of cloth to form the band of a lining, separate means for advancing a tip of a lining to meet the band at the sewing machine and means for rotating the tip as the sewing machine operates to sew the band and the tip together.

10. An apparatus for making hat linings, comprising the combination of a sewing machine, means for operating the sewing machine intermittently, means for positioning the foot and needle of the sewing machine in raised position at the end of each operation of the machine, and means operating in timed relation to the intermittent operation of the sewing machine for positioning underneath the foot and needle of the sewing machine, between the intermittent operations thereof, the materials to be sewed together to form a lining.

11. An apparatus for making hat linings, comprising the combination of a sewing machine, means for operating the sewing machine intermittently, means for positioning the foot and needle of the sewing machine in raised position at the end of each operation of the machine, means operating in timed relation to the intermittent operation of the sewing machine for positioning underneath the foot and needle of the sewing machine, between the intermittent operations thereof, the materials to be sewed together to form a lining and means for loosening the sewing thread which extends from the raised needle to the table of the sewing machine to permit such positioning underneath the needle of the materials to be sewed together.

12. An apparatus for making hat linings, comprising the combination of a sewing machine, means for operating the sewing machine, means for separately advancing to the sewing machine the materials to be sewed together to form a hat lining, a guide for directing to the sewing machine cord to be sewed to the lining for reinforcing the latter, means operable to position the cord between the lining materials which are advanced to the sewing machine and automatic means for severing the cord at intervals.

13. An apparatus for making hat linings, comprising the combination of a sewing machine, means for operating the sewing machine intermittently, means operating in timed relation to the operation of the sewing machine for advancing to the sewing machine, between each intermittent operation thereof, the band cloth and the tip of a hat lining, a guide for directing lining reinforcing cord from a continuous supply to the sewing machine and means for cutting the cord after each operation of the sewing machine to sever the cord in the completed lining from the cord held by the machine.

14. An apparatus for making hat linings, comprising the combination of a sewing machine, means for operating the sewing machine intermittently, means operating in timed relation to the operation of the sewing machine for advancing to the sewing machine, between each intermittent operation thereof, the band cloth and the tip of a hat lining, a guide for directing lining reinforcing cord from a continuous supply to the sewing machine, means for cutting the cord after each operation of the sewing machine to sever the cord in the completed lining from the cord which remains in the machine, and means operable to position the cord at the sewing machine whereby the band cloth and the tip are advanced to the sewing machine on opposite sides of the cord.

15. An apparatus for making hat linings, comprising the combination of a sewing machine, means for operating the sewing machine intermittently, means operating in timed relation to the operation of the sewing machine for advancing to the sewing machine, between each intermittent operation thereof, the band cloth and the tip of a hat lining, a guide for directing lining reinforcing cord from a continuous supply to the sewing machine, means for cutting the cord after each operation of the sewing machine to sever the cord in the completed lining from the cord which remains in the machine, means operable to position the cord at the sewing machine whereby the band cloth and the tip are advanced to the sewing machine on opposite sides of the cord and means for holding the severed end of the cord which remains in the machine in position so that it will be sewed to the lining in the next succeeding operation of the sewing machine.

16. A machine for making hat linings which consist of a tip and a band stitched to the edge of the tip, comprising the combination of a power driven sewing machine, a rotary tip advancing device, means for supplying tips to the device, gripping members on the device operable to grip each tip so supplied and carry it to the needle of the sewing machine as the device rotates, means for advancing bands to the needle, one for each tip, and positioning these bands in proper relation to the tip whereby the edges of the tip and band may be united by stitching while the tip is retained in the gripping members, and means for releasing the gripping members as they are carried away from the sewing machine in the operation of the tip feeding device and for removing the united tip and band therefrom.

17. A machine for making hat linings which consist of a tip and a band stitched to the edge of the tip, comprising the combination of a power driven sewing machine, a tip advancing device operable with a step by step motion and carrying a plurality of gripping members, means for supplying tips to the gripping members to be retained by the latter, the tip advancing device being arranged to position a tip in proper relation to the needle of the sewing machine during the period of rest between each movement, means for advancing bands to the needle and positioning one of these bands in proper relation to each tip, so that the edges of the two may be united by the action of the sewing machine, and means operable on the gripping member after the united tip and band have been carried from the sewing machine by the action of the tip advancing device, to release these members and permit the withdrawal of the finished lining therefrom.

18. A machine for making hat linings which consist of a tip and a band stitched to the edge of the tip, comprising the combination of a power driven sewing machine, a rotary device having a plurality of tip-gripping members, means for supplying tips to the device for retention by the members, means for advancing the rotary device with a step by step movement, at each period of rest of which a tip retained by gripper members is placed in proper relation to the sewing machine to be acted on by the needle thereof, and means for advancing a succession of bands to the needle and positioning a band in proper relation to each tip whereby the edges of the two may be united by stitching.

19. A machine for making hat linings which consist of a tip and a band stitched to the edge of the tip, comprising the combination of a power driven sewing machine, a rotary device having a plurality of tip-gripping members, means for supplying tips to the device for retention by the members, means for advancing the rotary device with a step by step movement, at each period of rest of which a tip retained by gripper members is placed in proper relation to the sewing machine to be acted on by the needle thereof, means for advancing a succession of bands to the needle and positioning a band in proper relation to each tip whereby the edges of the two may be united by stitching, and means acting upon the gripper members after the latter have passed beyond the sewing machine to permit the release of the finished lining therefrom.

20. A machine for making hat linings which consist of a tip and a band stitched to the edge of the tip, comprising the combination of a power driven sewing machine, a rotary device having a plurality of tip-gripping members, means for supplying tips to the device for retention by the members, means for advancing the rotary device with a step by step movement, at each period of rest of which a tip retained by gripper members is placed in proper relation to the sewing machine to be acted on by the needle thereof, means for advancing a succession of bands to the needle and positioning a band in proper relation to each tip whereby the edges of the two may be united by stitching, means operable upon the gripper members after the latter have passed beyond the sewing machine for releasing their grip on the finished lining, and means for withdrawing the finished lining from between the gripper members and discharging it.

21. A machine for making hat linings which consist of a tip and a band stitched to the edge of the tip, comprising the combination of a power driven sewing machine, a rotary device provided with a plurality of tip-gripping members, means for supplying tips to the device one after another, means for actuating the gripper members to seize the tips so supplied, driving mechanism for the device for advancing the latter with a step by step movement, the gripping members on the device being so positioned with reference to the sewing machine that the tip held by one set of members may be acted upon by the needle of the sewing machine at each period of rest of the rotary device, means for advancing a band to the needle with each step in the movement of the rotary device and positioning this band in such relation to the tip that the two may be united by the action of the needle, means acting upon the gripper members beyond the sewing machine to move them apart, and means for seizing the united tip and band and removing them from the opened gripper members.

22. A machine for making hat linings which consist of a tip and a band stitched to the edge of the tip, comprising the combination of a power driven sewing machine, a rotary tip advancing device, means for supplying tips to the device, means for advancing the rotary device with a step by step movement, such that at each period of rest in the moment a tip held thereon is adjacent the sewing machine and in position to be acted upon by the needle thereof, separate means for advancing a band to the needle and positioning this band in such relation to the tip that the tip and band may be united by stitching, and means for rotating the tip being sewn during the stitching operation whereby the line of stitching will follow the periphery of the tip.

23. A machine for making hat linings which consist of a tip and a band stitched to the edge of the tip, comprising the combination of a power driven sewing machine, a rotary tip advancing device, means for supplying tips to the device, means for advancing the rotary device with a step by step movement, such that at each period of rest in the movement a tip held thereon is adjacent the sewing machine in position to be acted on by the needle thereof, means for advancing a band to the needle and positioning this band in such relation to the tip that the tip and band may be united by stitching, and means for rotating the tip being sewn and also giving this tip a motion of oscillation during the sewing operation so that the line of stitching will follow the edge of the tip.

24. A machine for making hat linings which consist of a tip and a band stitched to the edge of the tip, comprising the combination of a power driven sewing machine, a rotary tip advancing device, means for supplying a succession of tips to the device, driving mechanism for advancing the device with a step by step movement, at each period of rest of which a tip held thereon is positioned in proper relation to the sewing machine to be acted upon by the latter, means for advancing bands to the needle and positioning a band in proper relation to each tip, such that the edges of the two may be united by stitching, this advancing means being driven in timed relation to the movement of the tip feeding device, and means for operating the sewing machine intermittently, this means causing the sewing machine to be started when a tip and band have been placed in proper relation thereto and to be stopped when the tip and band have been united by stitching extending throughout the periphery of the tip.

25. A machine for making hat linings which consist of a tip and a band stitched to the edge of the tip, comprising the combination of a power driven sewing machine, a rotary tip advancing device, means for supplying tips to the device, driving mechanism for advancing the device with a step by step movement, at each period of rest of which a tip held thereon is positioned in proper relation to the sewing machine to be acted upon by the latter, means for advancing bands to the needle and positioning a band in proper relation to each tip, such that the edges of the two may be united by stitching, this advancing means being driven in timed relation to the movement of the tip feeding device, means for operating the sewing machine intermittently, this means causing the sewing machine to be started when a tip and band have been placed in proper relation thereto, and to be stopped when the tip and band have been united by stitching extending throughout the periphery of the tip, and means for positioning the needle and foot of the sewing machine at the end of each sewing operation in such position that a tip and band may be placed beneath the latter.

26. A machine for making hat linings which consist of a tip and a band stitched to the edge of the tip, comprising the combination of a power driven sewing machine, automatic means for advancing a succession of tips to the needle of the machine one after another, automatic means for advancing bands to the machine and positioning a band in coincident relation to each tip whereby the edges of the two may be united by stitching, and means for placing a reinforcing member between the edge of the tip and the band as the two are being sewn, this reinforcing member being held in position by the stitching which unites the band and tip.

27. A machine for making hat linings which consist of a tip and a band stitched to the edge of the tip, comprising the combination of a power driven sewing machine, automatic means for advancing a succession of tips to the needle of the machine one after another, automatic means for advancing bands to the machine and positioning a band in coincident relation to each tip whereby the edges of the two may be united by stitching, and means for enclosing a reinforcing cord in a cover and placing the covered cord between the edges of the band and the tip in such position that the stitching uniting the band and tip passes through the cover and secures the latter to the finished lining.

28. A machine for making hat linings which consist of a tip and a band stitched to the edge of the tip, comprising the combination of a power driven sewing machine, means for advancing a succession of tips to the needle of the machine one after another, means for advancing bands to the machine and positioning a band in proper relation to each tip whereby the edges of the two may be united by stitching, means for supplying a reinforcing member to the sewing machine in such position that this member will be stitched in place between the tip and band as the latter are united by the needle, and means for severing the reinforcing member after a length of it has been sewn in the lining.

29. A machine for making hat linings which consist of a tip and a band stitched to the edge of the tip, comprising the combination of a power driven sewing machine, automatic means for advancing a succession of tips to the needle of the machine, automatic means for advancing bands to the needle and positioning a band in coincident relation to each tip whereby the edges of the two may be united by stitching, and a guide for delivering a covered cord to the sewing machine to be stitched by the latter between the edges of the tip and band which are to be united.

30. A machine for making hat linings which consist of a tip and a band stitched to the edge of the tip, comprising the combination of a power driven sewing machine, means for advancing a succession of tips to the needle of the machine, means for advancing bands to the needle and positioning a band in proper relation to each tip whereby the edges of the two may be united by stitching, a guide for delivering a covered cord to the sewing machine to be stitched by the latter between the edges of the tip and band which are to be united, and means for raising the guide to permit the band to be fed thereunder to the needle.

31. A machine for making hat linings which consist of a tip and a band stitched to the edge of the tip, comprising the combination of a power driven sewing machine, automatic means for advancing a succession of tips to the needle of the machine, automatic means for advancing bands to the needle and positioning a band in coincident relation to each tip whereby the edges of the two may be united by stitching, a guide for delivering a covered cord to the sewing machine to be stitched by the latter between the edges of the tip and band which are to be united, and means for holding the end of the covered cord in proper relation to the needle.

32. The combination with a sewing machine, of a guide for directing to the needle of the sewing machine a cord which is to be stitched into the article being made on the machine, this cord being drawn continuously from a supply by the machine while the latter is operating, a knife operable to sever the cord after the completion of the stitching of the article to permit the completed article to be removed from the sewing machine and a cord holding device for holding the stub of cord which remains in the machine in position so that it will be engaged by the needle of the sewing machine upon operation of the machine to make another article.

33. The combination with a sewing machine, of a guide for receiving a reinforcing cord and for folding around the cord a covering of tape, and directing the covered cord to the needle of the sewing machine so that it will be incorporated into the article being made on the machine, the folded tape having its edges extending from the cord and through which the needle of the machine places stitches, the cord and covering therefor being drawn continuously from supplies by the machine while the latter is operating, a knife operable to sever the covered cord after the completion of the article to permit the completed article to be removed from the machine, and a holding device for holding the stub of covered cord in position so that the edges of the tape will be engaged by the needle of the sewing machine upon operation of the machine to make another article.

34. A machine for making hat linings which consist of a tip and a band stitched to the edge of the tip, comprising the combination of a power driven sewing machine, means for advancing a succession of tips to the needle of the sewing machine, mechanism for drawing a strip of cloth from a supply, severing means for severing the cloth at an angle to the longitudinal axis of the strip to form bands and mechanism for advancing the bands to the needle of the sewing machine and positioning a band in proper relation to each tip whereby the edges of the tip and band may be united by the sewing machine by stitching.

35. A machine for making hat linings which consist of a tip and a band stitched to the edge of the tip, comprising the combination of a power driven sewing machine, means for advancing a succession of tips to the needle of the sewing machine, mechanism for drawing cloth from a supply, severing means for severing the cloth obliquely across the threads thereof to form bands and mechanism for advancing the bands on a line angularly disposed to the direction in which the cloth was drawn from the supply, to the needle of the sewing machine, and positioning a band in proper relation to each tip whereby the edges of the tip and the band may be united by the sewing machine by stitching.

36. A machine for making hat linings which consist of a tip and a band stitched to the edge of the tip, comprising the combination of a power driven sewing machine, means for advancing a succession of tips to the needle of the sewing machine, mechanism for drawing cloth from a supply in a direction parallel to threads in the cloth, severing means for severing the cloth obliquely across the threads thereof to form bands and mechanism for advancing the bands obliquely to the threads of the cloth, to the needle of the sewing machine and positioning a band in proper relation to each tip whereby the edges of the tip and the band may be united by the sewing machine by stitching.

37. Apparatus for making hat linings comprising the combination of a sewing machine, means for operating the sewing machine intermittently, means for advancing to the sewing machine a band and tip to be sewed together at each operation thereof to form a hat lining, means for feeding cord to the sewing machine from a supply to be sewed to the lining as a reinforcement, means for rotating the tip during the operation of the sewing machine, means for stopping the rotation of the tip prior to the completion of the sewing operation, means for moving the tip bodily while its rotation is stopped, whereby stitches are formed in a portion of the cord projecting beyond the point of attachment of the cord to the tip, and severing means for cutting the extending portion of the cord to form a projecting length of cord on the completed lining.

38. The combination with a sewing machine, of a guide for directing to the needle of the sewing machine a cord which is to be stitched to the article being made on the machine, this cord being drawn continuously from a supply by the machine while the latter is operating, a knife operable to sever the cord after the completion of the article to permit removal of the completed article from the machine, and a device for holding the stub of the cord which remains in the machine in proper position relative to the needle of the machine.

In testimony whereof I affix my signature.

MAX COHN.